US011126154B2

(12) United States Patent
Ueda et al.

(10) Patent No.: US 11,126,154 B2
(45) Date of Patent: Sep. 21, 2021

(54) CONTROL DEVICE, ROBOT AND CONTROL METHOD

(71) Applicant: Seiko Epson Corporation, Tokyo (JP)

(72) Inventors: Junya Ueda, Azumino (JP); Yuji Shimada, Shen Zhen (CN)

(73) Assignee: Seiko Epson Corporation ( * ) Notice: Subject to any disclaimer, the term of this patent is extended or adjusted under 35 U.S.C. 154(b) by 204 days.

(21) Appl. No.: 15/992,587

(22) Filed: May 30, 2018

(65) Prior Publication Data
US 2018/0348729 A1    Dec. 6, 2018

(30) Foreign Application Priority Data

May 31, 2017 (JP) .............................. JP2017-108500
Jan. 24, 2018 (JP) .............................. JP2018-009816

(51) Int. Cl.
G05B 15/00   (2006.01)
G05B 19/00   (2006.01)
(Continued)

(52) U.S. Cl.
CPC .......... G05B 19/401 (2013.01); B25J 9/1687 (2013.01); G05B 19/186 (2013.01);
(Continued)

(58) Field of Classification Search
CPC .. G05B 19/401; G05B 19/402; G05B 19/186; G05B 2219/39332; G05B 2219/40032;
(Continued)

(56) References Cited

U.S. PATENT DOCUMENTS

2008/0312769 A1* 12/2008 Sato ....................... B25J 9/1687
                                                         700/249
2012/0030956 A1*  2/2012 Lange .................... G01B 7/284
                                                          33/199 R
(Continued)

FOREIGN PATENT DOCUMENTS

EP    0459262 A2 * 12/1991   ............. G01B 5/204
JP    07301505 A  * 11/1995
(Continued)

OTHER PUBLICATIONS

Title: Force Control of robotics systems Authors: Dimitry Gorinevsky, Alexander Formalsky, Anatoly Yu Schneider, A. I ⁻U⁻ Shneĭder, Anatoli Schneider ISBN:978-0-8493-2671-4 Published on Dec. 31, 1997 (Year: 1997).*

Title: Force Control of robotics systems Authors: Dimitry Gorinevsky, Alexander Formalsky, Anatoly Yu Schneider, A. I ⁻U⁻ Shneĭder, Anatoli Schneider ISBN:978-0-8493-2671-4 Published on Dec. 31, 1997 (Year: 1997).*

(Continued)

Primary Examiner — Abby Y Lin
Assistant Examiner — Sohana Tanju Khayer
(74) Attorney, Agent, or Firm — Harness, Dickey & Pierce, P.L.C.

(57) ABSTRACT

A control device adapted to control a robot including a robot arm provided with a force detector includes a processor that is configured to execute computer-executable instructions so as to control the robot, wherein the processor is configured to: operate the robot arm to move a screw gauge which is disposed on a tip side of the force detector of the robot arm, used for an inspection of a screw hole, and provided with an external thread, to make the external thread have contact with the screw hole; then detect force applied to the screw gauge using the force detector to perform force control in a direction perpendicular to a direction of an axis of the screw hole based on detection information of the force detector; and operate the robot arm to move the screw gauge based on the force control.

20 Claims, 15 Drawing Sheets

(51) Int. Cl.
*G05B 19/401* (2006.01)
*B25J 9/16* (2006.01)
*G05B 19/18* (2006.01)
*G05B 19/402* (2006.01)

(52) U.S. Cl.
CPC .......... *G05B 19/402* (2013.01); *B25J 9/1633* (2013.01); *G05B 2219/37441* (2013.01); *G05B 2219/37606* (2013.01); *G05B 2219/39332* (2013.01); *G05B 2219/39346* (2013.01); *G05B 2219/39529* (2013.01); *G05B 2219/40032* (2013.01); *G05B 2219/45061* (2013.01); *G05B 2219/45091* (2013.01); *G05B 2219/49196* (2013.01)

(58) Field of Classification Search
CPC .......... G05B 2219/45091; G05B 2219/39346; G05B 2219/49196; G05B 2219/37441; G05B 2219/37606; G05B 2219/39529; G05B 2219/45061; G05B 2219/37357; G05B 2219/37207; B25J 9/1687; B25J 9/1633; B25J 15/0019; B25J 11/00; B25J 9/1679; B25J 9/1602; B25J 13/085; B04C 7/00; B04C 11/00; B04C 9/00; G01B 3/48; G01B 5/204; G01B 7/284
See application file for complete search history.

(56) References Cited

U.S. PATENT DOCUMENTS

| | | | | |
|---|---|---|---|---|
| 2015/0105907 A1* | 4/2015 | Aiso | .................... | B25J 9/1697 700/259 |
| 2016/0008980 A1* | 1/2016 | Ueda | .................... | B25J 9/1633 700/258 |
| 2017/0274534 A1* | 9/2017 | Takahashi | ............. | B25J 9/1697 |

FOREIGN PATENT DOCUMENTS

| | | | | |
|---|---|---|---|---|
| JP | 09-280854 A | 10/1997 | | |
| JP | H10-138058 A | 5/1998 | | |
| JP | 2002-331428 A | 11/2002 | | |
| JP | 3855322 B2 * | 12/2006 | ........... | B23P 19/065 |
| JP | 2008-261801 A | 10/2008 | | |
| JP | 2012-096296 A | 5/2012 | | |
| JP | 2013-072700 A | 4/2013 | | |

OTHER PUBLICATIONS

D.M. Gorinevsky et al., Force Control of Robotic Systems, CRC Press, Boca Raton, Florida, 1997, pp. 200-219 and 283-305.
Extended European Search Report for Patent Application No. EP18175080.3, dated Oct. 17, 2018 (10 pages).

* cited by examiner

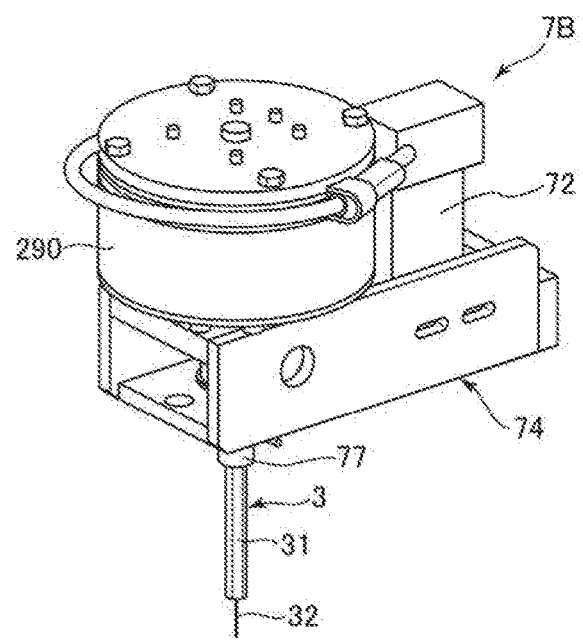
FIG.19
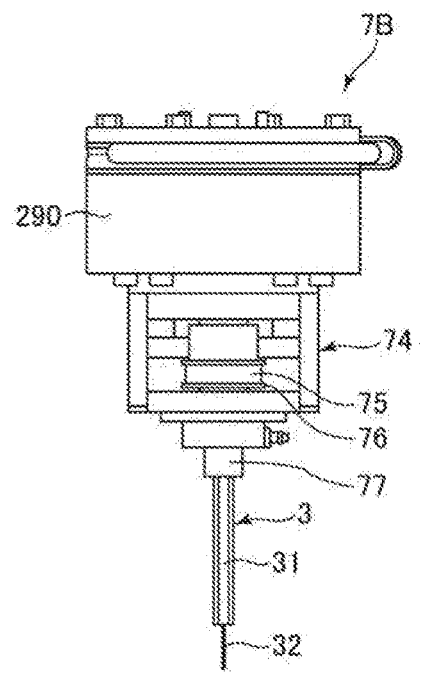
FIG.20
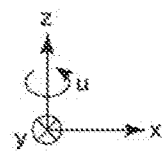

CONTROL DEVICE, ROBOT AND CONTROL METHOD

BACKGROUND

1. Technical Field

The present invention relates to a control device, a robot and a control method.

2. Related Art

Inspection of a screw hole is performed by a worker manually inserting a limit gauge for screw thread in the screw hole to screw the gauge in the screw hole, but in recent years, the automatization thereof is advancing.

In JP-A-2008-261801 (Document 1), there is disclosed a thread inspection device for inspecting the thread (the screw hole) using the limit gauge for screw thread.

In the thread inspection device described in Document 1, the decision to pass or fail is made by rotating the limit gauge for screw thread with a rotary motor while vertically moving the limit gauge for screw thread with a reciprocation device, then inserting the limit gauge for screw thread into the screw hole to screw the limit gauge for screw thread in the screw hole. Specifically, a load current of the rotary motor is detected, and in the case in which the load current equivalent to a torque exceeding the limit torque, which is one of determination parameters, has flown, drive of the rotary motor is stopped, and the decision to pass or fail is made. Further, in the case in which the load current is not in a level exceeding the limit torque, the decision to pass or fail is made based on the moving distance of the limit gauge for screw thread.

However, in the thread inspection device described in Document 1, there exist the following problems. Firstly, if the positions of the limit gauge for screw thread and the screw hole do not completely coincide with each other, the limit gauge for screw thread cannot be inserted into the screw hole, and thus, the inspection cannot be performed.

Further, in the case in which there is eccentricity in the limit gauge for screw thread or the thread inspection device, there is a possibility of damaging or breaking the screw hole with the limit gauge for screw thread when screwing the limit gauge for screw thread in the screw hole.

SUMMARY

An advantage of some aspects of the invention is to solve at least a part of the problems described above, and the invention can be implemented as the following forms or application examples.

A control device according to an aspect of the invention is a control device adapted to control a robot including a robot arm provided with a force detector including a processor that is configured to execute computer-executable instructions so as to control the robot, wherein the processor is configured to: operate the robot arm to move a screw gauge which is disposed on a tip side of the force detector of the robot arm, used for an inspection of a screw hole, and provided with an external thread, to make the external thread have contact with the screw hole, and then detect force applied to the screw gauge using the force detector to perform force control in a direction perpendicular to a direction of an axis of the screw hole based on detection information of the force detector, and operate the robot arm to move the screw gauge based on the force control.

According to such a control device according to the aspect of the invention, it is possible to easily and accurately achieve the alignment between the screw gauge and the screw hole, and thus, it is possible to easily and accurately insert the screw gauge into the screw hole.

In the control device according to the aspect of the invention, it is preferable that the processor is configured not to perform the force control in the direction of the axis on the robot in at least a part of a zone when inserting the external thread into the screw hole after making the external thread have contact with the screw hole.

Thus, it is possible to use the detection information of the force in the direction of the axis of the force detector for other control in the zone in which the force control in the direction of the axis is not performed on the robot.

In the control device according to the aspect of the invention, it is preferable that the processor is configured to perform the force control in the direction of the axis on the robot in at least a part of a zone when moving the external thread having been inserted into the screw hole toward an opposite direction to an insertion direction into the screw hole.

Thus, it is possible to prevent the screw gauge from damaging the screw hole, and further, it is possible to smoothly and accurately move the screw gauge toward an opposite direction to the insertion direction.

In the control device according to the aspect of the invention, it is preferable that the processor is configured to make the robot arm rotate the screw gauge in a case of rotating the screw gauge around the axis.

Thus, it is possible to rotate the screw gauge without separately attaching a device for rotating the screw gauge to the robot arm, and thus, it is possible to achieve reduction in size of the robot.

In the control device according to the aspect of the invention, it is preferable that the robot arm has a plurality of arms, and the processor is configured to rotate the screw gauge attached to the force detector provided to a tip most one of the arms of the robot arm.

Thus, it is possible to easily and accurately perform the control of rotating the screw gauge.

In the control device according to the aspect of the invention, it is preferable that the processor is configured to make a motor provided to the robot arm rotate the screw gauge in a case of rotating the screw gauge around the axis.

Thus, the robot arm is not required to rotate the screw gauge, and therefore, it is possible to prevent the wiring cable provided to the robot arm from being wound around the robot arm.

In the control device according to the aspect of the invention, it is preferable that the robot arm has a plurality of arms, and the processor is configured to rotate the screw gauge with the motor disposed with an offset with respect to the force detector provided to a tip most one of the arms of the robot arm.

Thus, it is possible to shorten the length from the tip of the robot arm to the tip of the screw gauge to achieve reduction in size of the robot compared to the case in which the motor is disposed without the offset with respect to the force detector.

In the control device according to the aspect of the invention, it is preferable that the robot arm has a plurality of arms, and the processor is configured to rotate the screw gauge overlapping a rotational axis of a tip most one of the arms of the robot arm viewed from an axial direction of the rotational axis.

Thus, it is possible to easily and accurately perform the control of rotating the screw gauge.

In the control device according to the aspect of the invention, it is preferable that the processor is configured to make a decision to pass or fail of the screw hole based on at least one of depth information of the screw hole, rotation information of the screw gauge, and detection information of the force detector.

Thus, it is possible to perform the inspection of the screw hole without requiring to separately prepare a device for making the decision to pass or fail of the screw hole.

In the control device according to the aspect of the invention, it is preferable that in the inspection of a GO aspect of the screw hole, a way of making the decision to pass or fail of the screw hole is different between a case in which the screw hole is a penetrating screw hole and a case in which the screw hole is a non-penetrating screw hole.

Thus, it is possible to accurately perform the inspection in each of the penetrating screw hole and the non-penetrating screw hole.

A robot according to another aspect of the invention includes a robot arm provided with a force detector, and a processor that is configured to execute computer-executable instructions so as to control the robot, wherein the processor is configured to: operate the robot arm to move a screw gauge which is disposed on a tip side of the force detector of the robot arm, used for an inspection of a screw hole, and provided with an external thread to make the external thread have contact with the screw hole, then detect force applied to the screw gauge using the force detector to perform force control in a direction perpendicular to a direction of an axis of the screw hole based on detection information of the force detector, and operate the robot arm to move the screw gauge based on the force control.

According to such a robot according to the aspect of the invention, it is possible to easily and accurately achieve the alignment between the screw gauge and the screw hole, and thus, it is possible to easily and accurately insert the screw gauge into the screw hole.

A control method according to another aspect of the invention is a method of controlling a robot including a robot arm provided with a force detector including operating the robot arm to move a screw gauge which is disposed on a tip side of the force detector of the robot arm, used for an inspection of a screw hole, and has an external thread, to make the external thread have contact with the screw hole, and detecting force applied to the screw gauge using the force detector to perform force control in a direction perpendicular to a direction of an axis of the screw hole based on detection information of the force detector, and operating the robot arm to move the screw gauge.

According to such a control method according to the aspect of the invention, it is possible to easily and accurately achieve the alignment between the screw gauge and the screw hole, and thus, it is possible to easily and accurately insert the screw gauge into the screw hole.

BRIEF DESCRIPTION OF THE DRAWINGS

The invention will be described with reference to the accompanying drawings, wherein like numbers reference like elements.

FIG. 19 is a perspective view of an end effector in a fourth embodiment of the invention.

FIG. 20 is a front view of the end effector in the fourth embodiment.

DESCRIPTION OF EXEMPLARY EMBODIMENTS

Hereinafter, a control device, a robot, and a control method according to the invention will be described in detail based on some embodiments shown in the accompanying drawings.

First Embodiment

Figure 1:
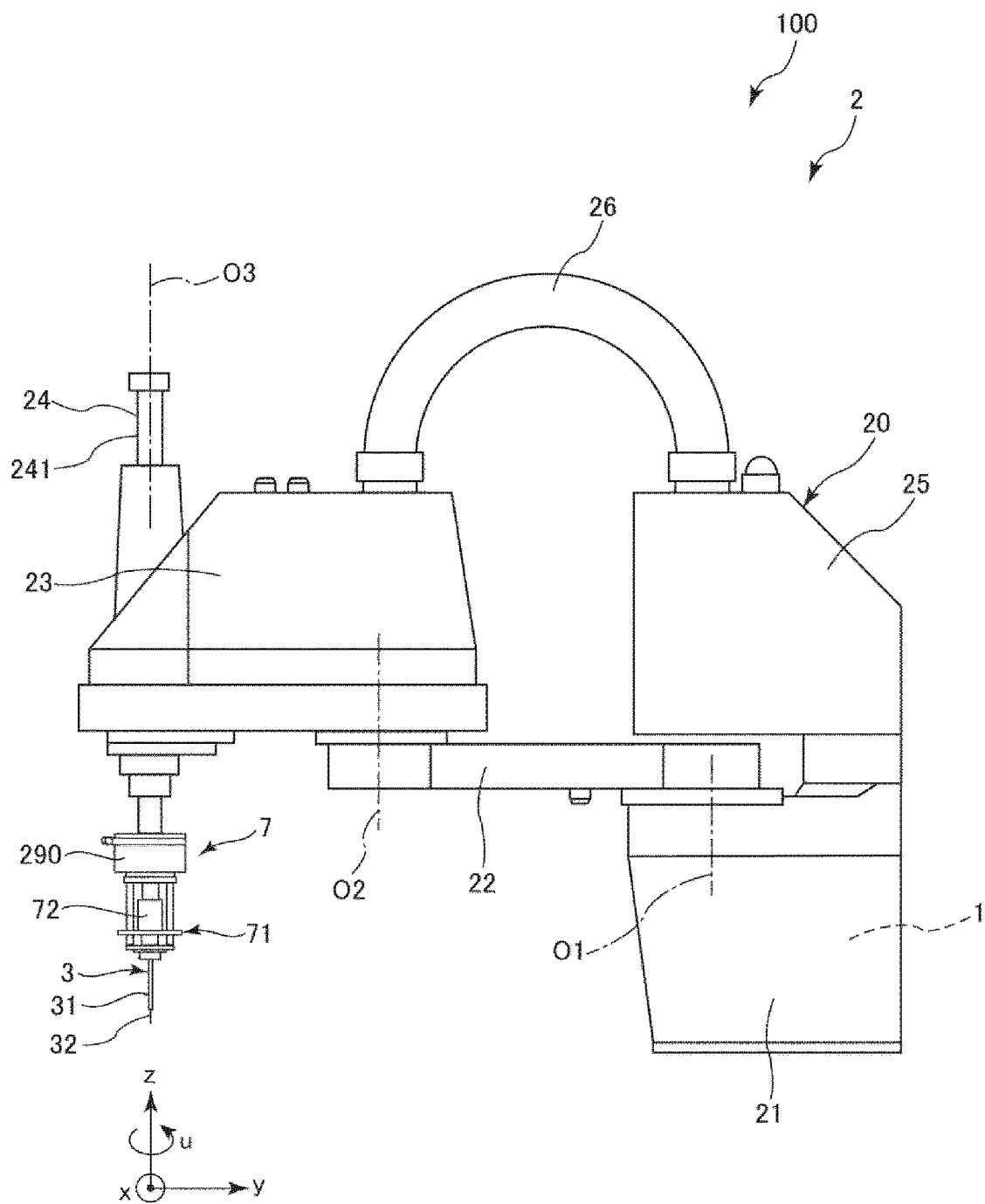
FIG. 1 is a side view showing a robot according to a first embodiment of the invention, and a robotic system equipped with the robot according to the first embodiment.
Figure 2:
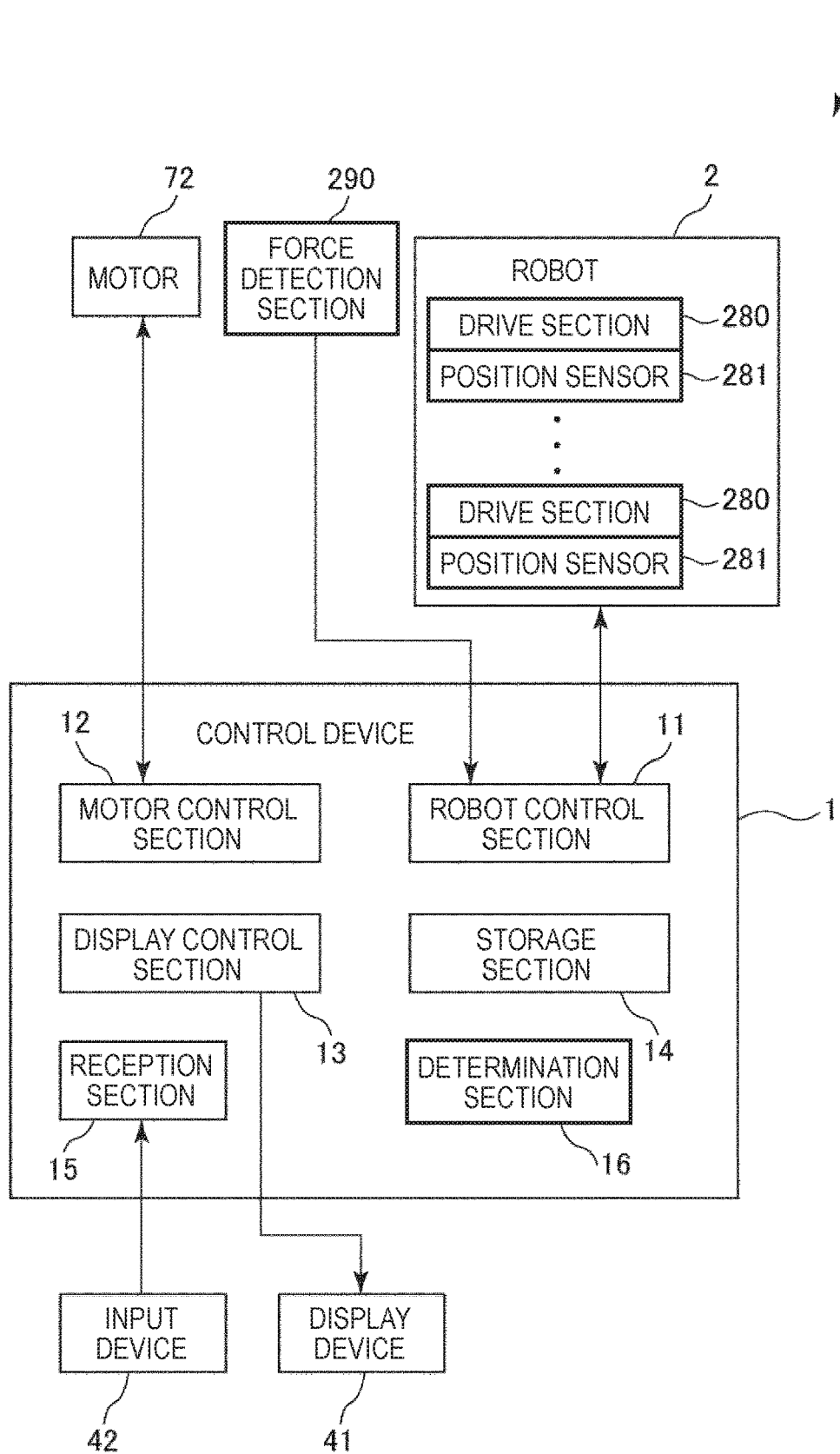
FIG. 2 is a block diagram of the robotic system shown in FIG. 1.
Figure 3:
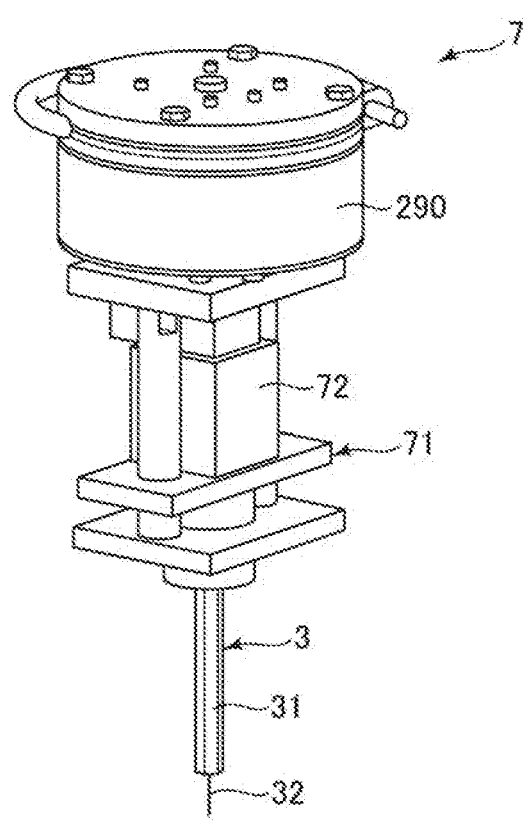
FIG. 3 is a perspective view of an end effector of the robotic system shown in FIG. 1.
Figure 4:
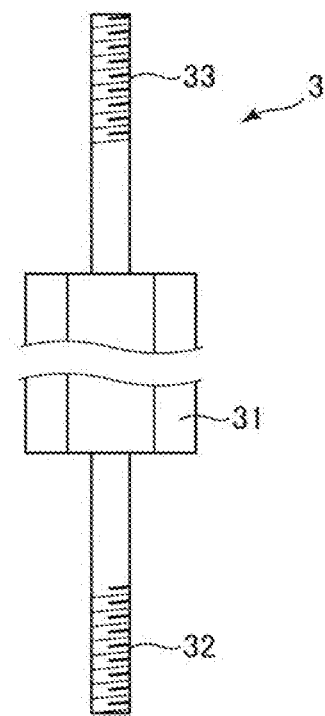
FIG. 4 is a side view of a limit gauge for screw thread of the end effector of the robotic system shown in FIG. 1.
Figure 5:
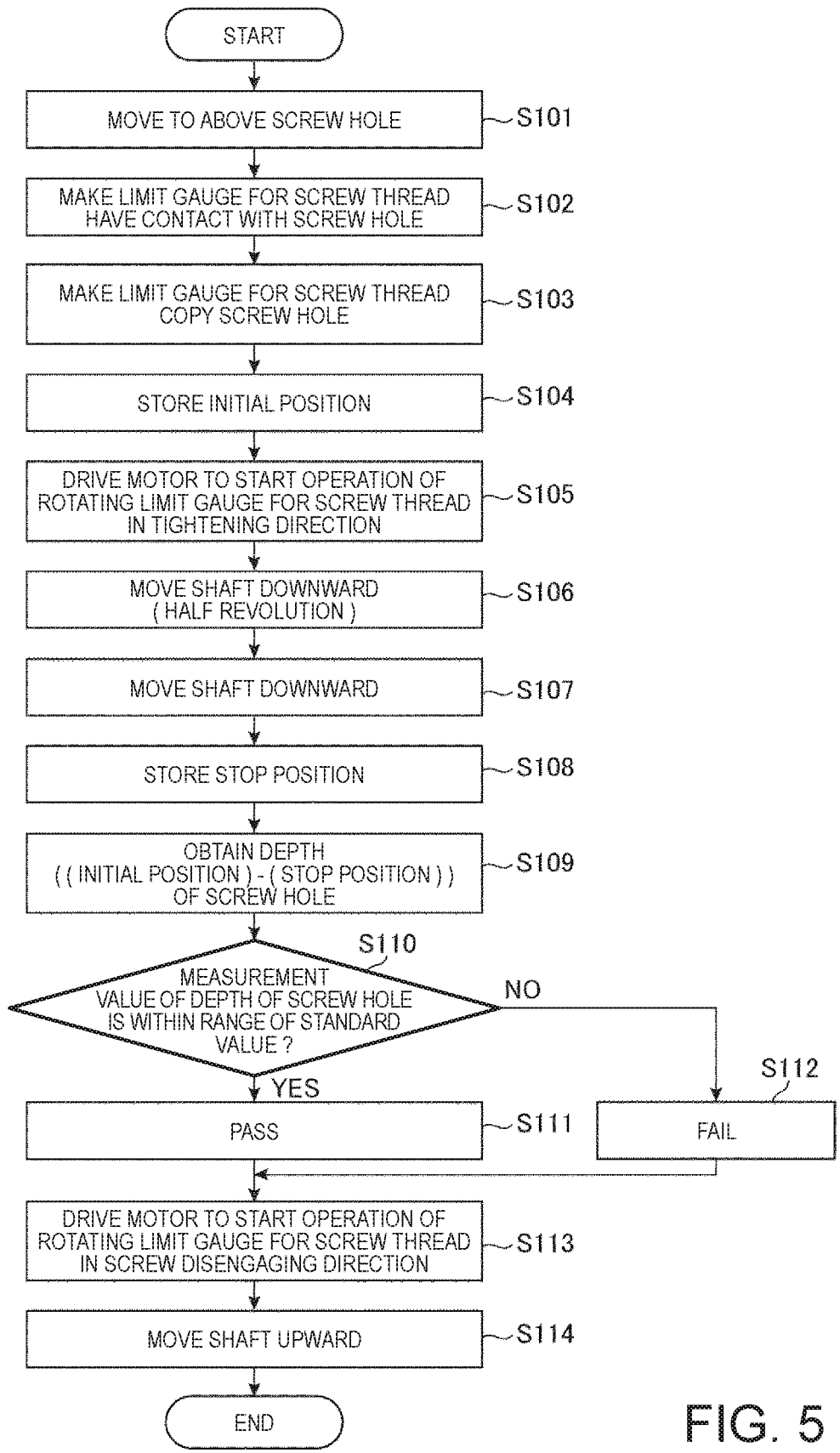
FIG. 5 is a flowchart showing a control operation in an inspection of a screw hole of a control device of the robotic system shown in FIG. 1.
Figure 6:
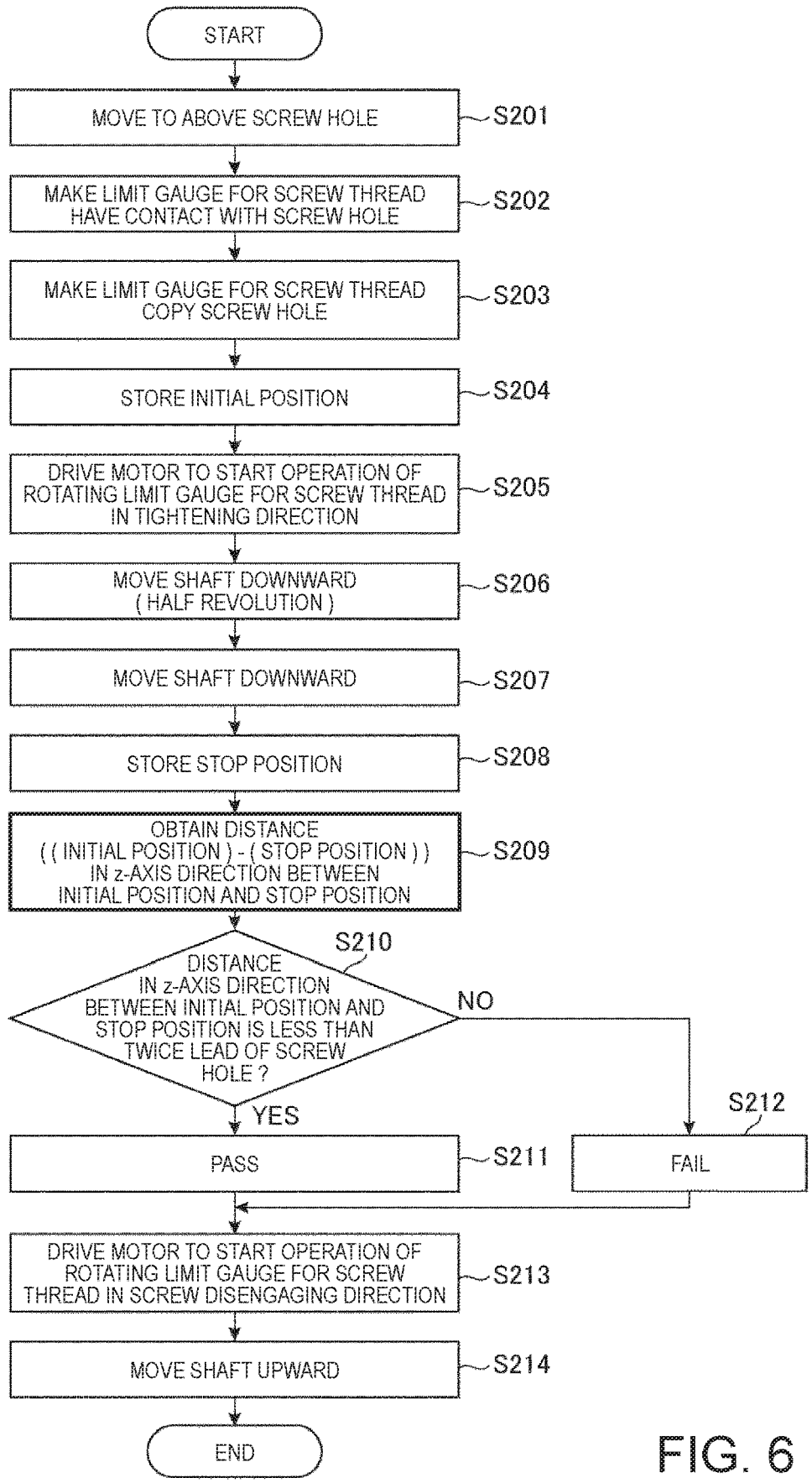
FIG. 6 is a flowchart showing a control operation in an inspection of the screw hole of the control device of the robotic system shown in FIG. 1.
Figure 9:
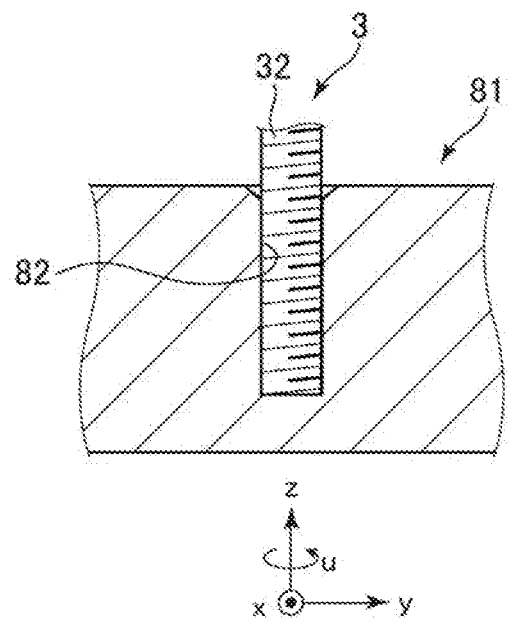
FIG. 9 is a diagram for explaining the inspection of the screw hole performed by the robotic system shown in FIG. 1.
Figure 10:
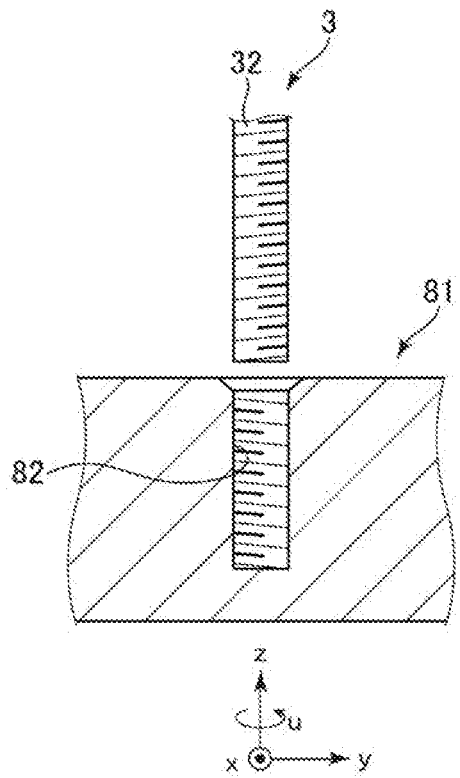
FIG. 10 is a diagram for explaining the inspection of the screw hole performed by the robotic system shown in FIG. 1.
Figure 11:
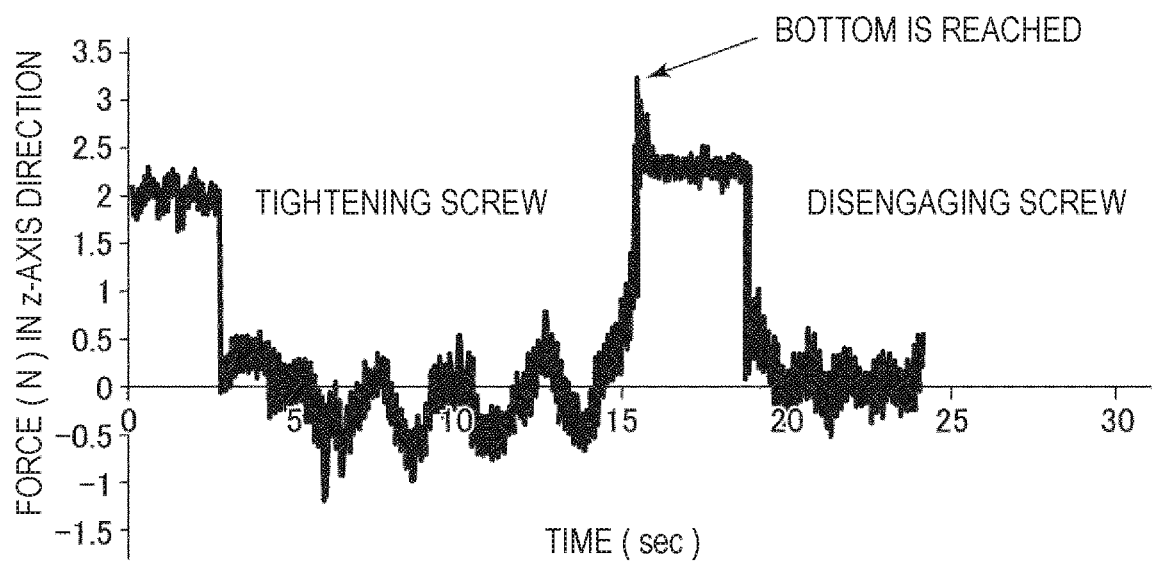
FIG. 11 is a graph showing force in a z-axis direction detected by a force detection section in the inspection of the screw hole performed by the robotic system shown in FIG. 1.
Figure 12:
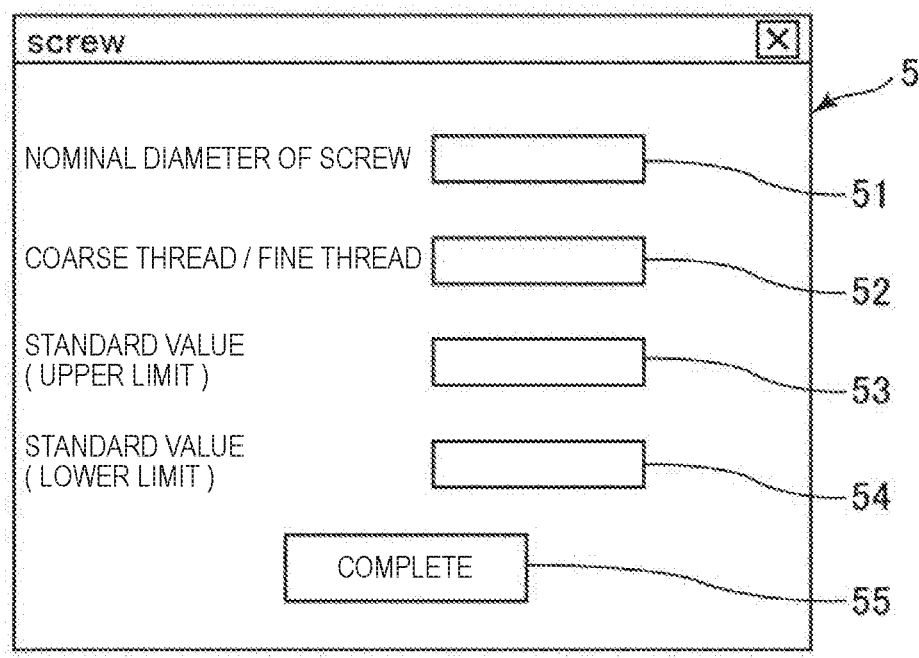
FIG. 12 is a diagram showing a window displayed on a display device of the robotic system shown in FIG. 1.

FIG. 1 is a side view showing a robot according to a first embodiment of the invention, and a robotic system equipped with the robot according to the first embodiment. FIG. 2 is a block diagram of the robotic system shown in FIG. 1. FIG. 3 is a perspective view of an end effector of the robotic system shown in FIG. 1. FIG. 4 is a side view of a limit gauge for screw thread of the end effector of the robotic system shown in FIG. 1. FIG. 5 and FIG. 6 are each a flowchart showing a control operation in an inspection of the screw hole of the control device of the robotic system shown in FIG. 1. FIG. 7 through FIG. 10 are each a diagram for explaining the inspection of the screw hole performed by the robotic system shown in FIG. 1. FIG. 11 is a graph showing force in a z-axis direction detected by a force detection section in the inspection of the screw hole performed by the robotic system shown in FIG. 1. FIG. 12 is a diagram showing a window displayed on a display device of the robotic system shown in FIG. 1. It should be noted that illustration of the display device 41 and the input device 42 is omitted in FIG. 1.

Further, in FIG. 1, FIG. 7 through FIG. 10, there are illustrated an x axis, a y axis, and a z axis as three axes perpendicular to each other for the sake of convenience of explanation. Further, hereinafter, a direction parallel to the x axis is referred to as an "x-axis direction," a direction parallel to the y axis is referred to as a "y-axis direction," and a direction parallel to the z axis is referred to as a "z-axis direction." Further, hereinafter, the tip side of each of the arrows illustrated is referred to as "+ (plus)," the base end side thereof is referred to as "− (minus)," a direction parallel to the +x-axis direction is also referred to as the "+x-axis direction," a direction parallel to the −x-axis direction is also referred to as the "−x-axis direction," a direction parallel to the +y-axis direction is also referred to as the "+y-axis direction," a direction parallel to the −y-axis direction is also referred to as the "−y-axis direction," a direction parallel to the +z-axis direction is also referred to as the "+z-axis direction," a direction parallel to the −z-axis direction is also referred to as the "−z-axis direction." Further, a direction around the z axis and a direction around an axis parallel to the z axis are also referred to as a "u-axis direction." The same as above applies also to other embodiments.

Further, the +z-axis direction (the + side in the z-axis direction) (the upper side) in FIG. 1 is also referred to as "upper side," and the −z-axis direction (the − side in the z-axis direction) (the lower side) is also referred to as "lower side" in the following descriptions for the sake of convenience of explanations. Further, regarding the robot arm 20, a platform 21 side in FIG. 1 is referred to as a "base end," and an opposite side (an end effector 7 side) is referred to as a "tip." Further, the z-axis direction (up-down direction) in FIG. 1 is defined as a "vertical direction," and the x-axis direction and the y-axis direction (right-left direction) are defined as a "horizontal direction." Further, it is assumed that the central axis of the limit gauge for screw thread, a third rotational axis O3, and the z axis coincide with or are parallel to each other. Further, in the specification, the term "horizontal" includes not only the case of being completely parallel, but also the case of being tilted within ±5° with respect to a horizontal line. Similarly, in the specification, the term "vertical" includes not only the case of being completely vertical, but also the case of being tilted within ±5° with respect to a vertical line. Further, in the specification, the term "parallel" includes not only the case in which two lines (including an axis) or planes are completely parallel to each other, but also the case in which those are tilted within ±5° from each other. Further, in the specification, the term "coincide" includes not only the case in which two lines (including an axis) or planes completely coincide with each other, but also the case in which those are tilted within ±5° from each other. Further, in the specification, the term "perpendicular" includes not only the case in which two lines (including an axis) or planes are completely perpendicular to each other, but also the case in which those are tilted within ±5° from each other. The same as above applies also to other embodiments.

The robotic system 100 shown in FIG. 1 and FIG. 2 is, for example, a device used in an operation such as holding, conveying, assembling, or inspection of a work (an object) such as an electronic component or an electronic apparatus. The robotic system 100 is provided with a control device 1, a robot 2, an end effector 7, a display device 41 (a display section), and an input device 42 (an input section).

Further, in the present embodiment, the whole of the control device 1 is incorporated in the robot 2. In other words, the control device 1 and the robot 2 are configured as a unit.

It should be noted that the configuration in which the whole of the control device 1 is incorporated in the robot 2 is not a limitation, but it is also possible to, for example, incorporate a part of the control device 1 in the robot 2, and further, the control device 1 can also be configured separately from the robot 2.

Further, the robot 2 and the control device 1 can also be electrically connected (hereinafter simply referred to as "connected") to each other with cables (wiring cables) to be arranged so as to perform communication using a wired system, or arranged so as to perform communication using a wireless system omitting the cable. In other words, the robot 2 and the control device 1 can be connected with wired communication, or can also be connected with wireless communication.

Robot

The type of the robot 2 is not particularly limited, but the robot 2 is a scalar robot as an example of a horizontal articulated robot in the present embodiment.

As shown in FIG. 1, the robot 2 is provided with a platform 21, a first arm 22, a second arm 23, a working head 24, a housing 25, and a pipe 26. The first arm 22, the second arm 23, the working head 24 and so on constitute a robot arm 20.

Further, the housing 25 is connected to an upper part of the platform 21. Further, one end part of the pipe 26 is connected to the housing 25, the other end part is connected to the second arm 23, and wiring cables are disposed in the pipe 26.

Further, the robot 2 is provided with a drive section 280 for rotating (driving) the first arm 22 with respect to the platform 21, a drive section 280 for rotating the second arm 23 with respect to the first arm 22, a drive section 280 for rotating a shaft 241 of the working head 24 with respect to the second arm 23, a drive section 280 for moving the shaft 241 in the z-axis direction with respect to the second arm 23, and a motor driver (not shown) for moving each of the drive sections 280.

Each of the drive sections 280 is provided with a motor (not shown) for generating drive force, and a reduction mechanism (not shown) for decelerating the drive force of the motor. As the motor provided to each of the drive sections 280, there can be used a servomotor such as an AC servomotor or a DC servomotor. Further, as the reduction mechanism provided to each of the drive sections 280, there can be used, for example, a planetary gear-type reduction mechanism or a wave gear device. Further, each of the drive sections 280 is provided with a position sensor 281 (an angular sensor) for detecting a rotational angle of a rotary shaft of the motor or the reduction mechanism. Further, each of the drive sections 280 is connected to a corresponding motor driver (not shown), and is controlled by a robot control section 11 of the control device 1 via the motor driver. It should be noted that in each of the drive sections 280, the reduction mechanism can also be omitted.

Further, the platform 21 is fixed to, for example, a floor surface not shown with bolts or the like. To the upper end part of the platform 21, there is connected the first arm 22. The first arm 22 is made rotatable around a first rotational axis O1 parallel to a vertical direction with respect to the platform 21. When the drive section 280 for rotating the first arm 22 is driven, the first arm 22 rotates in a horizontal plane around the first rotational axis O1 with respect to the platform 21. Further, it is arranged that it is possible to detect the drive (the rotation amount) of the first arm 22 with respect to the platform 21 using the position sensor 281.

Further, to the tip part of the first arm 22, there is connected the second arm 23. The second arm 23 is made rotatable around a second rotational axis O2 parallel to a vertical direction with respect to the first arm 22. The axial direction of the first rotational axis O1 and the axial direction of the second rotational axis O2 are the same as each other. In other words, the second rotational axis O2 is parallel to the first rotational axis O1. When the drive section 280 for rotating the second arm 23 is driven, the second arm 23 rotates in a horizontal plane around the second rotational axis O2 with respect to the first arm 22. Further, it is arranged that it is possible to detect the drive (the rotation amount) of the second arm 23 with respect to the first arm 22 using the position sensor 281.

Further, in the tip part of the second arm 23, there is installed the working head 24 having the shaft 241 (spline shaft). The shaft 241 is made rotatable around a third rotational axis O3 parallel to a vertical direction with respect to the second arm 23, and is made movable (to be able to move up and down) in up and down directions (both directions in the z-axis direction) (both directions in a vertical direction). The shaft 241 is a third arm of the robot arm 20, and the tip most arm of the robot arm 20.

When the drive section 280 for rotating the shaft 241 is driven, the shaft 241 makes a forward or reverse rotation (rotates) around the z axis. Further, it is arranged that it is possible to detect the rotation amount of the shaft 241 with respect to the second arm 23 using the position sensor 281.

Further, when the drive section 280 for moving the shaft 241 in the z-axis direction is driven, the shaft 241 moves in a vertical direction (moves in the z-axis direction). Further, it is arranged that it is possible to detect the displacement in the z-axis direction of the shaft 241 with respect to the second arm 23 using the position sensor 281.

Further, to the tip part (the lower end part) of the shaft 241, there is detachably connected (attached) one of a variety of types of end effectors. The end effectors are not particularly limited, and there can be cited, for example, those for gripping a conveyance target, those for processing a processing target, and those used for an inspection. In the present embodiment, the end effector 7 is detachably connected. The end effector 7 will be described later in detail.

It should be noted that the end effector 7 is not a constituent of the robot 2 in the present embodiment, but it is also possible for a part (e.g., a force detection section 290) or the whole of the end effector 7 to be a constituent of the robot 2. Further, the end effector 7 is not a constituent of the robot arm 20 in the present embodiment, but it is also possible for a part (e.g., the force detection section 290) or the whole of the end effector 7 to be a constituent of the robot arm 20.

End Effectors

As shown in FIG. 1, FIG. 3 and FIG. 4, the end effector 7 includes the force detection section 290, an attachment section 71 (a frame) attached to the force detection section 290, a motor 72 provided to the attachment section 71, and a limit gauge for screw thread 3 (a screw gauge) attached detachably and concentrically to the rotary shaft of the motor 72. In the end effector 7, the force detection section 290 is detachably connected to the tip part of the shaft 241 directly or via a coupling member not shown. Therefore, the limit gauge for screw thread 3 is disposed on the tip side of the force detection section 290 in the robot arm 20. Further, the central axis of the shaft 241, namely the third rotational axis O3, the rotary shaft of the motor 72, and the central axis of the limit gauge for screw thread 3 coincide with each other. In other words, the third rotational axis O3, the motor 72, and the limit gauge for screw thread 3 overlap each other viewed from the axial direction of the third rotational axis O3.

Further, the limit gauge for screw thread 3 is an example of a screw gauge, and has a grip part 31 having a columnar shape, a GO gauge 32 (a screw part) disposed on one end part of the grip part 31 and provided with an external thread, and a NO-GO gauge 33 (a screw part) disposed on the other end part of the grip part 31 and provided with an external thread. In the limit gauge for screw thread 3, the end part of the grip part 31 provided with the NO-GO gauge 33 is attached to the rotary shaft of the motor 72 to dispose the GO gauge 32 on the tip side in the case of using the GO gauge 32. Further, in the case of using the NO-GO gauge 33, the end part of the grip part 31 provided with the GO gauge 32 is attached to the rotary shaft of the motor 72 to dispose the NO-GO gauge 33 on the tip side.

Further, the GO gauge 32 is used for an inspection of effective diameters of screw holes 82, 83 (see FIG. 7 and FIG. 16), specifically an inspection for confirming the fact that the effective diameters are not too small with respect to a standard value. Citing a specific example of the inspection performed using the GO gauge 32, "PASS" is determined in the case in which the GO gauge 32 can be screwed in the screw holes 82, 83 as much as a length equal to or longer than a predetermined length (e.g., throughout the whole length of the screw holes 82, 83).

Further, the NO-GO gauge 33 is larger in diameter than the GO gauge 32, and is used for an inspection of the effective diameters of the screw holes 82, 83, specifically an inspection for confirming the fact that the effective diameters are not too large with respect to the standard value. Citing a specific example of the inspection performed using the NO-GO gauge 33, "PASS" is determined in the case in which the NO-GO gauge 33 cannot be screwed in the screw holes 82, 83 as much as a number of revolutions equal to or larger than a predetermined number (e.g., two revolutions) (or as much as a larger number of revolutions than the predetermined number).

Further, the motor 72 is not particularly limited, but there is used, for example, a servomotor such as an AC servomotor or a DC servomotor, or a stepping motor.

Further, the end effector 7 has a position sensor (an angular sensor) not shown for detecting the rotational angle of the rotary shaft of the motor 72, and is arranged to be able to detect the rotational angle of the rotary shaft of the motor 72 using the position sensor.

Further, the force detection section 290 is formed of, for example, a force sensor (e.g., a six-axis force sensor) for detecting the force (including the moment) applied to the limit gauge for screw thread 3. It should be noted that in the present embodiment, the force detection section 290 is a constituent of the end effector 7, but is not limited thereto, and can also be a constituent of the robot 2 or the robot arm 20.

In this end effector 7, it is possible to suppress the deterioration of the rotational accuracy due to the backlash compared to the case in which a power transmission mechanism such as gears or a belt intervenes between the rotary shaft of the motor 72 and the limit gauge for screw thread 3.

It should be noted that the limit gauge for screw thread 3 is not limited to one having such a configuration, but can also be one having a configuration in which, for example, a limit gauge for screw thread having only the GO gauge and a limit gauge for screw thread having only the NO-GO gauge are used in a replaceable manner.

Further, the end effector 7 is detachably attached to the robot arm 20 in the present embodiment, but is not limited thereto, but can also be made unable to be detached from the robot arm 20, or it is also possible for the force detection section 290 to be made unable to be detached from the robot arm 20.

Control Device

As shown in FIG. 2, the control device 1 is provided with a robot control section 11 (a control section), a motor control section 12 (an end effector control section), a display control section 13, a storage section 14, a reception section 15, and a determination section 16, and controls drive (operation) of the constituents of the robot system 100 such as the robot 2, the motor 72 of the end effector 7, and a display device 41. The robot control section 11 and the motor control section 12 constitute the "control section" in the control device according to the invention. Further, the robot control section 11 controls the drive of the robot 2, and further, transmits an instruction (command) to the motor control section 12, and then, the motor control section 12 controls the drive of the motor 72 based on the instruction. In other words, it can also be said that the control section 11 has a function of controlling the drive of the motor 72. In this case, the robot control section 11 constitutes the "control section" in the control device according to the invention.

Further, the control device 1 is configured so that the robot control section 11, the motor control section 12, the display control section 13, the storage section 14, the reception section 15, and the determination section 16 can communicate with each other. In other words, the robot control section 11, the motor control section 12, the display control section 13, the storage section 14, the reception section 15, and the determination section 16 are connected (hereinafter also referred to simply as "connected") to each other with wired or wireless communication.

Further, to the control device 1, there are connected the robot 2, the display device 41, the input device 42, and the end effector 7 (the motor 72, the force detection section 290, and the position sensor not shown) with wired or wireless communication.

In other words, to the robot control section 11 of the control device 1, there are connected the robot 2, and the force detection section 290 with wired or wireless connection. Further, to the motor control section 12 of the control device 1, there are connected the motor 72 and the position sensor (not shown) for detecting the rotational angle of the rotary shaft of the motor 72 with wired or wireless communication. Further, to the display control section 13 of the control device 1, there is connected the display device 41 with wired or wireless communication. Further, to the reception section 15 of the control device 1, there is connected the input device 42 with wired or wireless communication.

Robot Control Section

The robot control section 11 controls the drive of the robot 2, namely the drive of the robot arm 20 and so on. The robot control section 11 is a computer in which a program (e.g., an OS) is installed. The robot control section 11 has, for example, a CPU as a processor, a RAM, and a ROM storing the program. Further, the function of the robot control section 11 can be realized by, for example, the CPU executing a variety of programs.

Motor Control Section

The motor control section 12 controls the drive of the motor 72. The motor control section 12 is a computer in which a program (e.g., an OS) is installed. The motor control section 12 has, for example, a CPU as a processor, a RAM, and a ROM storing the program. Further, the function of the motor control section 12 can be realized by, for example, the CPU executing a variety of programs.

Display Control Section

The display control section 13 has a function of making the display device 41 display a variety of types of images (including a variety of types of screens such as a window), letters, and so on. In other words, the display control section 13 controls the drive of the display device 41. The function of the display control section 13 can be realized by, for example, a GPU.

Determination Section

The determination section 16 makes a decision to pass or fail of the screw holes 82, 83 in the inspection of the screw holes 82, 83 (internal threads). In the present embodiment, the determination section 16 makes the decision to pass or fail of the screw hole 82 based on at least one of depth information of the screw hole 82, rotational information of the limit gauge for screw thread 3 (screw gauge), and detection information of the force detection section 290. The determination section 16 has, for example, a CPU as a processor, a RAM, and a ROM storing the program. Further, the function of the determination section 16 can be realized by, for example, a CPU executing a variety of programs. It should be noted that the determination section 16 can also be a constituent of the robot control section 11.

Storage Section

The storage section 14 has a function of storing a variety of types of information (including data, programs, and so on). The storage section 14 stores a control program and so on. The function of the storage section 14 can be realized by the ROM or the like, or the so called external storage device (not shown).

Reception Section

The reception section 15 has a function of receiving an input from the input device 42. The function of the reception section 15 can be realized by, for example, an interface circuit. It should be noted that in the case of using, for example, a touch panel, the reception section has a function as an input detection section for detecting contact of a finger of the user with the touch panel or the like.

Display Device

The display device 41 is provided with a monitor (not shown) formed of, for example, a liquid crystal display, an EL display, or the like, and has a function of displaying, for example, a variety of images (including a variety of types of screens such as a window), letters, and so on.

Input Device

The input device 42 is formed of, for example, a mouse and a keyboard. Therefore, it is possible for the user to make instructions of a variety of types of processes to the control device 1 by operating the input device 42.

Specifically, it is possible for the user to make the instruction to the control device 1 due to an operation of clicking a variety of types of screens (e.g., windows) displayed on the display device 41 using the mouse of the input device 42, or an operation of inputting letters, figures, and so on using the keyboard of the input device 42. Hereinafter, the instruction (input using the input device 42) using the input device 42 by the user is also referred to as an "operation instruction." The operation instruction includes a selection operation for selecting a desired content from the contents displayed on the display device 41 using the input device 42, an input instruction for inputting letters, figures, and so on using the input device 42, and so on. Further, the input includes selection.

It should be noted that in the present embodiment, it is also possible to provide a display input device (not shown) provided with both of the display device 41 and the input device 42 (a display section and an input section) instead of the display device 41 and the input device 42. As the display input device, it is possible to use, for example, a touch panel (e.g., an electrostatic touch panel or a pressure-sensitive touch panel). Further, it is also possible for the input device 42 to have a configuration of recognizing a sound (including a voice).

Basics of Control in Robotic System

In the operation (e.g., an inspection), the control device 1 controls the drive (operation) of the robot 2 using position control, force control, and so on based on the output of each of the position sensors 281 and the force detection section 290, namely the detection information (a detection result) of each of the position sensors 281, the detection information (a detection result) of the force detection section 290, and so on.

The position control denotes the control of the operation of the robot 2 for moving the tip part of the robot arm 20 or the end effector 7 of the robot 2 to a target position so as to have a target posture based on information related to the position and the posture of the tip part of the robot arm 20 or the end effector 7. Further, the information related to the position and the posture of the tip part of the robot arm 20 or the end effector 7 can be obtained based on the detection information of each of the position sensors 281.

Further, the force control denotes the control of the operation of the robot 2 for changing the position or the posture of the tip part of the robot arm 20 or the end effector 7, or pushing or pulling the end effector 7 based on the detection information of the force detection section 290 using the detection of the force by the force detection section 290. The force control includes, for example, impedance control and so on.

The impedance control includes following control. Firstly, in a brief description, the operation of the robot arm 20 (the robot 2) is controlled in the impedance control so as to keep the force applied to the tip part of the robot arm 20 to predetermined force as precisely as possible, namely so as to keep the force in a predetermined direction detected by the force detection section 290 at a target value (including 0) as precisely as possible. Thus, for example, when the impedance control is performed on the robot arm 20 (the robot 2), the robot arm 20 performs an operation in which the end effector 7 copies the object in the predetermined direction.

Further, in more detailed description, the model of the impedance control of the robot 2 can be expressed by, for example, the motion equation shown in the formula (A) described below.

$$f(t) = mx'' + cx' + kx \quad \text{(A)}$$

In the formula (A) described above, m represents a mass (inertia), c represents a viscosity coefficient, k represents a elastic (rigidity) coefficient, f(t) represents force, and x represents a displacement (position) from the target position. Further, the first derivation of x, namely x', corresponds to velocity, and the second derivation of x, namely x'', corresponds to acceleration. It should be noted that hereinafter, m, c, and k are each also referred to simply as a "parameter."

In the impedance control, there is formed a control system for providing the characteristics represented by the formula (A) described above to the tip part of the robot arm 20. Therefore, the control is performed as if the tip part of the robot arm 20 is provided with a virtual mass, a virtual viscosity coefficient, and a virtual elastic coefficient represented by the formula (A) described above.

Further, each of the parameters m, c, and k in the formula (A) described above is not particularly limited, but can arbitrarily be set based on a variety of conditions. In other words, the parameters m, c, and k are each set to an expedient value in accordance with the operation to be performed by the robot 2.

The robotic system 100 performs an operation to a predetermined object and so on under the control by the control device 1, for example. In the present embodiment, the robotic system performs the inspection of the screw hole 82. In the inspection of the screw hole 82, the robot 2 screws (inserts) the limit gauge for screw thread 3 of the end effector 7 into the screw hole 82.

Further, as shown in FIG. 12, in the inspection of the screw hole 82, a window 5 (a setting screen) for the inspection is displayed on the display device 41. In the window 5, there are displayed text boxes 51, 52, 53, 54 for input, and a button 55 (icon) displayed as "COMPLETE." The text box 51 has a function of inputting the nominal diameter of the screw hole 82 (the internal thread). Further, the text box 52 has a function of inputting the type of the screw hole 82, namely whether the screw hole 82 is a coarse thread or a fine thread. Further, the text box 53 has a function of inputting an upper-limit value (an upper limit) of a standard value of the depth of the screw hole 82. Further, the text box 54 has a function of inputting a lower-limit value (a lower limit) of the standard value of the depth of the screw hole 82.

Firstly, in the window 5 displayed on the display device 41, the user makes an operation instruction for inputting the corresponding information (conditions) of the screw hole 82 respectively in the text boxes 51, 52, 53, 54. Here, in the invention, "input" includes "selection."

Specifically, the user inputs the nominal diameter (e.g., "M1") of the screw hole 82 (thread) in the text box 51. Further, the user inputs the type of the screw hole 82, namely whether the screw hole 82 is a coarse thread or a fine thread (e.g., "coarse thread"), in the text box 52. Further, the user inputs the upper-limit value (the upper limit) of the standard value of the depth of the screw hole 82 in the text box 53. Further, the user inputs the lower-limit value (the lower limit) of the standard value of the depth of the screw hole 82 in the text box 54.

Then, the user performs the operation instruction to the button 55 displayed as "COMPLETE." When the reception section 15 of the control device 1 receives the operation instruction to the button 55 by the user, the control device 1, for example, the robot control section 11, generates a program (an inspection program) for the inspection of the screw hole 82. Then, the control device 1 executes the program to control the drive of the robot 2 and so on to perform the inspection of the screw hole 82.

Then, the operation (a control operation of the control device 1) of the robotic system 100 in the inspection of the screw hole 82 provided to a work 81 will be described based on FIG. 5 through FIG. 10.

Firstly, the screw hole 82 (the internal thread) of the inspection object is a bottomed (non-penetrating) screw hole provided to the work 81. The axial direction of the screw hole 82 coincides with the z-axis direction in the present embodiment. Further, in the entrance of the screw hole 82, there is formed a tapered shape (a tapered surface) so that the inside diameter gradually increases toward the +z-axis direction. It should be noted that the tapered shape can also be omitted.

Further, in the present embodiment, in the inspection of the screw hole 82, the limit gauge for screw thread 3 is rotated by the motor 72 of the end effector 7 provided to the robot arm 20 instead of rotating the limit gauge for screw thread 3 using the robot arm 20. Hereinafter, this method is referred to as a "motor method."

Firstly, the control method in the inspection of the screw hole 82 is provided with a process (a first process) of operating the robot arm 20 to move the limit gauge for screw thread 3 (the screw gauge) to make the GO gauge 32 (or the NO-GO gauge 33) of the limit gauge for screw thread 3 have contact with the screw hole 82, and a process (a second process) of detecting the force in the x-axis direction and the force in the y-axis direction applied to the limit gauge for screw thread 3 by the force detection section 290, and then performing the force control in the x-axis direction and the y-axis direction (directions perpendicular to the axial direction of the screw hole 82) on the robot 2 (the robot arm 20) based on the detection information of the force detection section 290 to operate the robot arm 20 to move the limit gauge for screw thread 3 so as to reduce the force in the directions perpendicular to the axial direction (the z-axis direction) of the screw hole 82, namely the force in the x-axis direction and the force in the y-axis direction. It should be noted that in the present embodiment, the force control is performed in the x-axis direction and the y-axis direction, but the direction of the force control can be an arbitrary direction in a plane having the axis of the screw hole 82 as the normal line thereof.

Then, the operation of the robotic system 100 in the inspection of a GO aspect of the screw hole 82 will be described.

Firstly, the robot 2 (the robot arm 20) is made to operate (put in action) to move (step S101 shown in FIG. 5) a tip (a lower end) of the GO gauge 32 of the limit gauge for screw thread 3 to above the screw hole 82. In the step S101, the force control is not performed on the robot 2 (the robot arm 20), but the position control is performed thereon. Further, in the step S102 described later and the steps following the step S102, the position control and the force control are performed on the robot 2.

Figure 7:
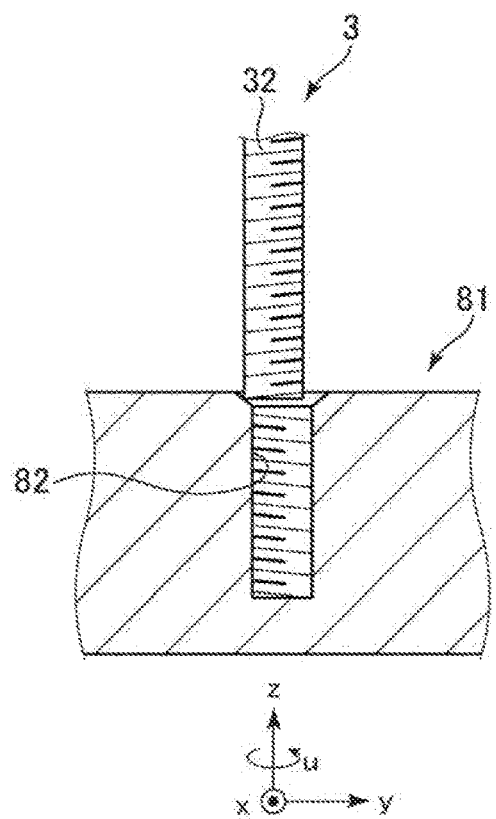
FIG. 7 is a diagram for explaining the inspection of the screw hole performed by the robotic system shown in FIG. 1.

Subsequently, as shown in FIG. 7, the robot 2 is made to operate, in other words, the shaft 241 is moved downward to make the tip of the GO gauge 32 have contact with the screw hole 82 (step S102) (a first process in the control method). In this operation of the robot 2, the force in the z-axis direction applied to the limit gauge for screw thread 3 is detected by the force detection section 290 to perform the force control (the impedance control) in the z-axis direction to operate the robot 2. Further, the target force in the z-axis direction of the force control is not particularly limited, but is arbitrarily set in accordance with a variety of conditions, and is, for example, 2 N citing an example. Thus, the tip of the GO gauge 32 has contact with the entrance (an opening in the +z-axis direction) of the screw hole 82.

It should be noted that it is also possible to move the limit gauge for screw thread 3 in the z-axis direction using the position control, for example, and then stop the limit gauge for screw thread 3 in the case in which predetermined force (e.g., 2 N) is detected in the z-axis direction by the force detection section 290, for example, instead of the force control.

Figure 8:
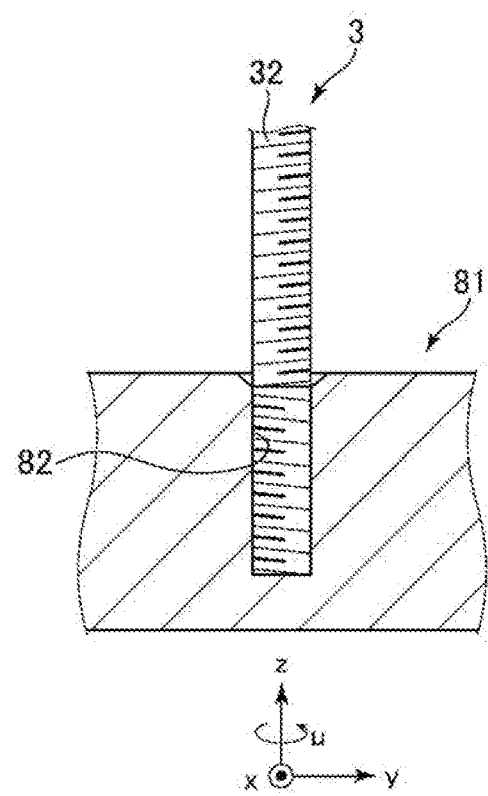
FIG. 8 is a diagram for explaining the inspection of the screw hole performed by the robotic system shown in FIG. 1.

Subsequently, as shown in FIG. 8, the robot 2 is made to operate to make the tip of the GO gauge 32 copy the entrance of the screw hole 82 (step S103) (a second process in the control method). In this operation of the robot 2, the force in the x-axis direction and the force in the y-axis direction applied to the limit gauge for screw thread 3 are detected by the force detection section 290, and then the limit gauge for screw thread 3 is moved so as to reduce the force in a direction perpendicular to the axial direction of the screw hole 82, namely the force in the x-axis direction and the force in the y-axis direction, based on the detection information (the detection result) of the force detection section 290. Specifically, the force control (the impedance control) is performed with respect to each of the directions perpendicular to the axial direction of the screw hole 82, namely the x-axis direction and the y-axis direction, to operate the robot 2. Further, the target force in the x-axis direction and the target force in the y-axis direction of the force control are not particularly limited, but are arbitrarily set in accordance with a variety of conditions, and are each, for example, 0 N citing an example. Thus, the limit gauge for screw thread 3 moves in a direction in which the force in the x-axis direction and the force in the y-axis direction applied to the limit gauge for screw thread 3 decrease, and the center of the tip of the GO gauge 32 moves to the center of the entrance of the screw hole 82. Therefore, the GO gauge 32 is disposed inside the screw hole 82 viewed from the z-axis direction.

Here, in the step S103, the tip of the GO gauge 32 moves in the x-axis direction and the y-axis direction while colliding with the tapered part of the entrance of the screw hole 82 to change the moving direction in the x-y plane, and thus, the center of the tip of the GO gauge 32 gradually comes closer to the center of the entrance of the screw hole 82, and then the GO gauge 32 is disposed inside the screw hole 82 viewed from the z-axis direction.

Specifically, the tip of the GO gauge 32 is moved in the x-axis direction and the y-axis direction while detecting the force in the x-axis direction and the force in the y-axis direction applied to the limit gauge for screw thread 3 using the force detection section 290 to collide with the tapered part of the entrance of the screw hole 82.

Then, by moving the limit gauge for screw thread 3 while changing the moving direction in the x-y plane based on the detection information of the force detection section 290, and at the same time, slightly moving the limit gauge for screw thread 3 in the −z-axis direction, the tip of the GO gauge 32 is made to collide with the tapered part of the entrance of the screw hole 82. Thus, the center of the tip of the GO gauge 32 comes closer to the center of the entrance of the screw hole 82. By performing such an operation two or more times, the center of the tip of the GO gauge 32 gradually comes closer to the center of the entrance of the screw hole 82, and eventually, the GO gauge 32 is disposed inside the screw hole 82 viewed from the z-axis direction.

It should be noted that in the case in which the tapered part is not provided to the entrance of the screw hole 82, for example, a search operation for moving the GO gauge 32 in the x-axis direction and the y-axis direction to search for the screw hole 82 is performed to dispose the GO gauge 32 inside the screw hole 82.

Subsequently, the current position in the z-axis direction of the tip of the GO gauge 32 is stored (step S104) in the storage section 14 as an initial position.

Then, an operation of driving the motor 72 to rotate the limit gauge for screw thread 3 in a direction of tightening the GO gauge 32 is started (step S105).

Then, the shaft 241 is moved downward (step S106). Due to the rotation of the limit gauge for screw thread 3 and the downward motion of the shaft 241, the GO gauge 32 is screwed in the screw hole 82, and the tip of the GO gauge 32 moves toward (in the direction of tightening the GO gauge 32) the bottom of the screw hole 82. In this operation of the robot 2, the force in the x-axis direction, the force in the y-axis direction, and the force in the z-axis direction applied to the limit gauge for screw thread 3 are detected by the force detection section 290 to perform the force control (the impedance control) in each of the x-axis direction, the y-axis direction, and the z-axis direction, and further, the position control is performed in the z-axis direction to operate the robot 2. Further, the target force in the x-axis direction, the target force in the y-axis direction, and the target force in the z-axis direction of the force control are not particularly limited, but are arbitrarily set in accordance with a variety of conditions, and the target force in the x-axis direction, the target force in the y-axis direction, and the target force in the z-axis direction are each, for example, 0 N citing an example. Thus, it is possible to prevent the GO gauge 32 from damaging the screw hole 82, and further, it is possible to smoothly and accurately move the GO gauge 32 in the tightening direction. The step S106 is performed until the limit gauge for screw thread 3 rotates a predetermined number of revolutions (e.g., a half revolution). It should be noted that it is also possible to omit the force control in the z-axis direction in the present zone.

Then, the shaft 241 is continuously moved downward (step S107). In this operation of the robot 2, the force in the x-axis direction and the force in the y-axis direction applied to the limit gauge for screw thread 3 are detected by the force detection section 290 to perform the force control (the impedance control) in each of the x-axis direction and the y-axis direction, and further, the position control is performed in the z-axis direction to operate the robot 2. In this case, the force control is not performed in the z-axis direction in the present zone. Further, the target force in the x-axis direction and the target force in the y-axis direction of the force control are not particularly limited, but are arbitrarily set in accordance with a variety of conditions, and are each, for example, 0 N citing an example. Thus, it is possible to prevent the GO gauge 32 from damaging the screw hole 82, and further, it is possible to smoothly and accurately move the GO gauge 32 in the tightening direction. Further, the force in the z-axis direction is detected by the force detection section 290, and when predetermined force (e.g., 3 N) is detected in the z-axis direction, the shaft 241 and the motor 72 are stopped. In such a manner as described above, the tip of the GO gauge 32 has contact with the bottom of the screw hole 82 as shown in FIG. 9. In other words, the GO gauge 32 is tightened into the screw hole 82. It should be noted that the tip of the GO gauge 32 does not reach the bottom of the screw hole 82 in some cases. Further, in the step S107, since the force control is not performed in the z-axis direction, the detection information of the force in the z-axis direction of the force detection section 290 can be used for other control.

Specifically, detection of predetermined force in the z-axis direction is used as a stop condition for the shaft 241 and the motor 72.

Subsequently, the current position in the z-axis direction of the tip of the GO gauge 32 is stored (step S108) in the storage section 14 as a stop position.

Then, the depth (length in the z-axis direction) of the screw hole 82 is obtained (step S109) based on the initial position and the stop position. The depth of the screw hole 82 is obtained by subtracting the stop position from the initial position, and is stored in the storage section 14 as a measurement value.

Subsequently, the decision to pass or fail is made for the GO aspect of the screw hole 82 based on the measurement value of the depth of the screw 82 and the upper limit value and the lower limit value of the standard value (a specified value) of the depth of the screw hole 82.

Specifically, whether or not the measurement value of the depth of the screw hole 82 is within a range of the standard value of the depth of the screw hole 82 is determined (step S110), and if it is within the range, "PASS" is determined (step S111), and if it is out of the range, "FAIL" is determined (step S112).

The inspection result in the GO aspect of the screw hole 82 is stored in the storage section 14, and is displayed by the display device 41 as needed.

Then, an operation of driving the motor 72 to rotate the limit gauge for screw thread 3 in a direction of disengaging the GO gauge 32 is started (step S113).

Then, the shaft 241 is moved upward (step S114). Due to the rotation of the limit gauge for screw thread 3 and the upward motion of the shaft 241, the limit gauge for screw thread 3 moves in a direction in which the GO gauge is disengaged from the screw hole 82 (the loosening direction). In this operation of the robot 2, the force in the x-axis direction, the force in the y-axis direction, and the force in the z-axis direction applied to the limit gauge for screw thread 3 are detected by the force detection section 290 to perform the force control (the impedance control) in each of the x-axis direction, the y-axis direction, and the z-axis direction, and further, the position control is performed in the z-axis direction to operate the robot 2. Further, the target force in the x-axis direction, the target force in the y-axis direction, and the target force in the z-axis direction of the force control are not particularly limited, but are arbitrarily set in accordance with a variety of conditions, and the target force in the x-axis direction, the target force in the y-axis direction, and the target force in the z-axis direction are each, for example, 0 N citing an example. Thus, it is possible to prevent the GO gauge 32 from damaging the screw hole 82, and further, it is possible to smoothly and accurately move the GO gauge 32 in the disengaging direction. In such a manner as described above, the limit gauge for screw thread 3 is moved until the tip of the GO gauge 32 reaches the position distant as much as a predetermined distance (e.g., 0.2 mm) toward the + side in the z-axis direction from the initial position, and then the shaft 241 and the motor 72 are stopped as shown in FIG. 10. It should be noted that it is also possible to omit the force control in the z-axis direction in a part or the whole of the present zone. With the above, the program is terminated.

Then, the operation of the robotic system 100 in the inspection of a NO-GO aspect of the screw hole 82 will be described.

Firstly, the step S201 through the step S206 shown in FIG. 6 are the same as the step S101 through the step S106 except that the GO gauge 32 is replaced with the NO-GO gauge 33 in the step S101 through the step S106 described above, and the description thereof will be omitted.

Subsequently to the step S206, the shaft 241 is continuously moved downward (step S207). In this operation of the robot 2, the force in the x-axis direction and the force in the y-axis direction applied to the limit gauge for screw thread 3 are detected by the force detection section 290 to perform the force control (the impedance control) in each of the x-axis direction and the y-axis direction, and further, the position control is performed in the z-axis direction to operate the robot 2. Further, the target force in the x-axis direction and the target force in the y-axis direction of the force control are not particularly limited, but are arbitrarily set in accordance with a variety of conditions, and are each, for example, 0 N citing an example. Thus, it is possible to prevent the NO-GO gauge 33 from damaging the screw hole 82, and further, it is possible to smoothly and accurately move the NO-GO gauge 33 in the tightening direction. Further, the force in the z-axis direction is detected by the force detection section 290, and when predetermined force (e.g., 3 N) is detected in the z-axis direction, the shaft 241 and the motor 72 are stopped. In such a manner as described above, the limit gauge for screw thread 3 stops before the tip of the NO-GO gauge 33 reaches the bottom of the screw hole 82, or stops when the tip of the NO-GO gauge 33 reaches the bottom of the screw hole 82. Further, in the step S207, since the force control is not performed in the z-axis direction, the detection information of the force in the z-axis direction of the force detection section 290 can be used for other control. Specifically, detection of predetermined force in the z-axis direction is used as a stop condition for the shaft 241 and the motor 72.

Subsequently, the current position in the z-axis direction of the tip of the NO-GO gauge 33 is stored (step S208) in the storage section 14 as a stop position.

Then, the distance in the z-axis direction between the initial position and the stop position is obtained (step S209). In the step S209, the stop position is subtracted from the initial position, and then, the subtraction result is stored in the storage section 14.

Then, the decision to pass or fail is made for the NO-GO aspect of the screw hole 82 based on the distance in the z-axis direction between the initial position and the stop position.

Specifically, whether or not the distance in the z-axis direction between the initial position and the stop position is less than twice the lead of the screw hole 82 is determined (step S210), and if it is less than twice the lead of the screw hole 82, "PASS" is determined (step S211), and if it is equal to or more than twice the lead of the screw hole 82, "FAIL" is determined (step S212). The lead of the screw hole 82 denotes the distance that the limit gauge for screw thread 3 proceeds with respect to the screw hole 82 when the limit gauge for screw thread 3 (the NO-GO gauge 33) makes one revolution with respect to the screw hole 82. It should be noted that "twice" as the threshold value to pass or fail is illustrative only, and the threshold value can also be set to a different value.

The inspection result in the NO-GO aspect of the screw hole 82 is stored in the storage section 14, and is displayed by the display device 41 as needed.

It should be noted that in the present embodiment, the decision to pass or fail is made based on the distance in the z-axis direction between the initial position and the stop position with respect to the NO-GO aspect of the screw hole 82, but this is not a limitation, and it is possible to make the decision to pass or fail based on, for example, the number of revolutions (an amount of the rotation) of the limit gauge for screw thread 3 (the NO-GO gauge 33). Specifically, the number of revolutions (an amount of rotation) which the limit gauge for screw thread 3 makes until the tip of the NO-GO gauge 33 moves from the initial position to the stop position is obtained to determine whether or not the number of the revolutions which the limit gauge for screw thread 3 makes is less than two revolutions, and if it is less than two revolutions, "PASS" is determined, and if it is equal to or more than two revolutions, "FAIL" is determined. It should be noted that "two revolutions" as the threshold value to pass or fail is illustrative only, and the threshold value can also be set to a different value.

Further, the step S213 and the step S214 are the same as the step S113 and the step S114 except that the GO gauge 32 is replaced with the NO-GO gauge 33 in the step S113 and the step S114 described above, and the description thereof will be omitted. With the above, the program is terminated.

In the inspection of the GO aspect of the screw hole 82, the force in the z-axis direction applied to the limit gauge for screw thread 3 transitions as shown in FIG. 11, for example. In the graph shown in FIG. 11, the peak described as "BOTTOM IS REACHED" represents the force in the z-axis direction when the tip of the GO gauge 32 of the limit gauge for screw thread 3 has reached the bottom of the screw hole 82 in the process of moving the shaft 241 downward.

As described hereinabove, according to the robotic system 100, it is possible to easily and accurately achieve the alignment between the limit gauge for screw thread 3 and the screw hole 82, and thus, it is possible to easily and accurately insert the GO gauge 32 and the NO-GO gauge 33 of the limit gauge for screw thread 3 into the screw hole 82.

Further, when the GO gauge 32 or the NO-GO gauge 33 of the limit gauge for screw thread 3 is inserted into or disengaged from the screw hole 82, it is possible to prevent the limit gauge for screw thread 3 from damaging the screw hole 82.

As described hereinabove, the control device 1 is a device for controlling the robot 2 having the robot arm 20 provided with the force detection section 290.

The control device 1 is provided with the robot control section 11 (the control section). The robot control section 11 operates the robot arm 20 to move the limit gauge for screw thread 3 (the screw gauge), which is disposed on the tip side of the force detection section 290 of the robot arm 20, used for the inspection of the screw hole 82, and has the GO gauge 32 and the NO-GO gauge 33 (the screw section), to make the GO gauge 32 (or the NO-GO gauge 33) (the screw section) have contact with the screw hole 82, then detects the force applied to the limit gauge for screw thread 3 (the screw gauge) using the force detection section 290 to perform the force control in the direction perpendicular to the axial direction of the screw hole 82 based on the detection information of the force detection section 290, and then operates the robot arm 20 to move the limit gauge for screw thread 3 (the screw gauge). It should be noted that it is also possible for the robot control section 11 and the motor control section 12 to constitute the control section. Further, the force detection section 290 can detachably be attached to the robot arm 20, or can also be disposed so as not to be detached.

According to such a control device 1, it is possible to easily and accurately achieve the alignment between the limit gauge for screw thread 3 and the screw hole 82, and thus, it is possible to easily and accurately insert the limit gauge for screw thread 3 into the screw hole 82.

Further, when the robot control section 11 (the control section) inserts the GO gauge 32 (or the NO-GO gauge 33) (the screw section) into the screw hole 82 after making the GO gauge 32 (or the NO-GO gauge 33) (the screw section) have contact with the screw hole 82, the robot control section 11 (the control section) does not perform the force control in the axial direction of the screw hole 82 with respect to the robot 2 in at least a part of the zone.

Thus, it is possible to use the detection information of the force in the axial direction of the screw hole 82 of the force detection section 290 for other control in the zone in which the force control in the axial direction of the screw hole 82 is not performed on the robot 2.

Further, when the robot control section 11 (the control section) moves the GO gauge 32 (or the NO-GO gauge 33) (the screw section) having inserted into the screw hole 82 toward the opposite direction to the insertion direction to the screw hole 82, the robot control section 11 (the control section) performs the force control in the axial direction of the screw hole 82 on the robot 2 in at least a part of the zone.

Thus, it is possible to prevent the limit gauge for screw thread 3 from damaging the screw hole 82, and further, it is possible to smoothly and accurately move the limit gauge for screw thread 3 toward an opposite direction to the insertion direction.

Further, in the case in which the robot control section 11 (the control section) rotates the limit gauge for screw thread 3 (the screw gauge) around the axis of the screw hole 82, the robot control section 11 (the control section) rotates the limit gauge for screw thread 3 (the screw gauge) using the motor 72 provided to the robot arm 20.

Thus, the robot arm 20 is not required to rotate the limit gauge for screw thread 3, and therefore, it is possible to prevent the wiring cable provided to the robot arm 20 from being wound around the robot arm 20.

Further, the robot arm 20 has the first arm 22, the second arm 23, and the working head 24 provided with the shaft 241 (the plurality of arms). The robot control section 11 (the control section) rotates the limit gauge for screw thread 3 (the screw gauge) the central axis of which coincides with the rotational axis (the third rotational axis O3) of the shaft 241 as an example of the tip most arm of the robot arm 20.

Thus, it is possible to easily and accurately perform the control of rotating the limit gauge for screw thread 3.

Further, the control device 1 has the determination section 16 for making the decision to pass or fail of the screw hole 82 based on at least one of depth information of the screw hole 82, rotational information of the limit gauge for screw thread 3 (the screw gauge), and detection information of the force detection section 290.

Thus, it is possible to perform the inspection of the screw hole 82 without requiring to separately prepare a device for making the decision to pass or fail of the screw hole 82.

Further, the robot 2 has the robot arm 20 provided with the force detection section 290, and is controlled by the control device 1.

According to such a robot 2, it is possible to easily and accurately achieve the alignment between the limit gauge for screw thread 3 and the screw hole 82, and thus, it is possible to easily and accurately insert the limit gauge for screw thread 3 into the screw hole.

Further, the control method is a control method for controlling the robot 2 having the robot arm 20 provided with the force detection section 290.

The control method is provided with a process (a first process) of operating the robot arm 20 to move the limit gauge for screw thread 3 (the screw gauge), which is disposed on the tip side of the force detection section 290 of the robot arm 20, used for the inspection of the screw hole 82, and has the GO gauge 32 and the NO-GO gauge 33 (the screw section), to make the GO gauge 32 (or the NO-GO gauge 33) (the screw section) have contact with the screw hole 82, and a process (a second process) of detecting the force applied to the limit gauge for screw thread 3 (the screw gauge) using the force detection section 290 to perform the force control in the direction perpendicular to the axial direction of the screw hole 82 based on the detection information of the force detection section 290, and then operating the robot arm 20 to move the limit gauge for screw thread 3 (the screw gauge).

According to such a control method, it is possible to easily and accurately achieve the alignment between the limit gauge for screw thread 3 and the screw hole 82, and thus, it is possible to easily and accurately insert the limit gauge for screw thread 3 into the screw hole 82.

Second Embodiment

Figure 13:
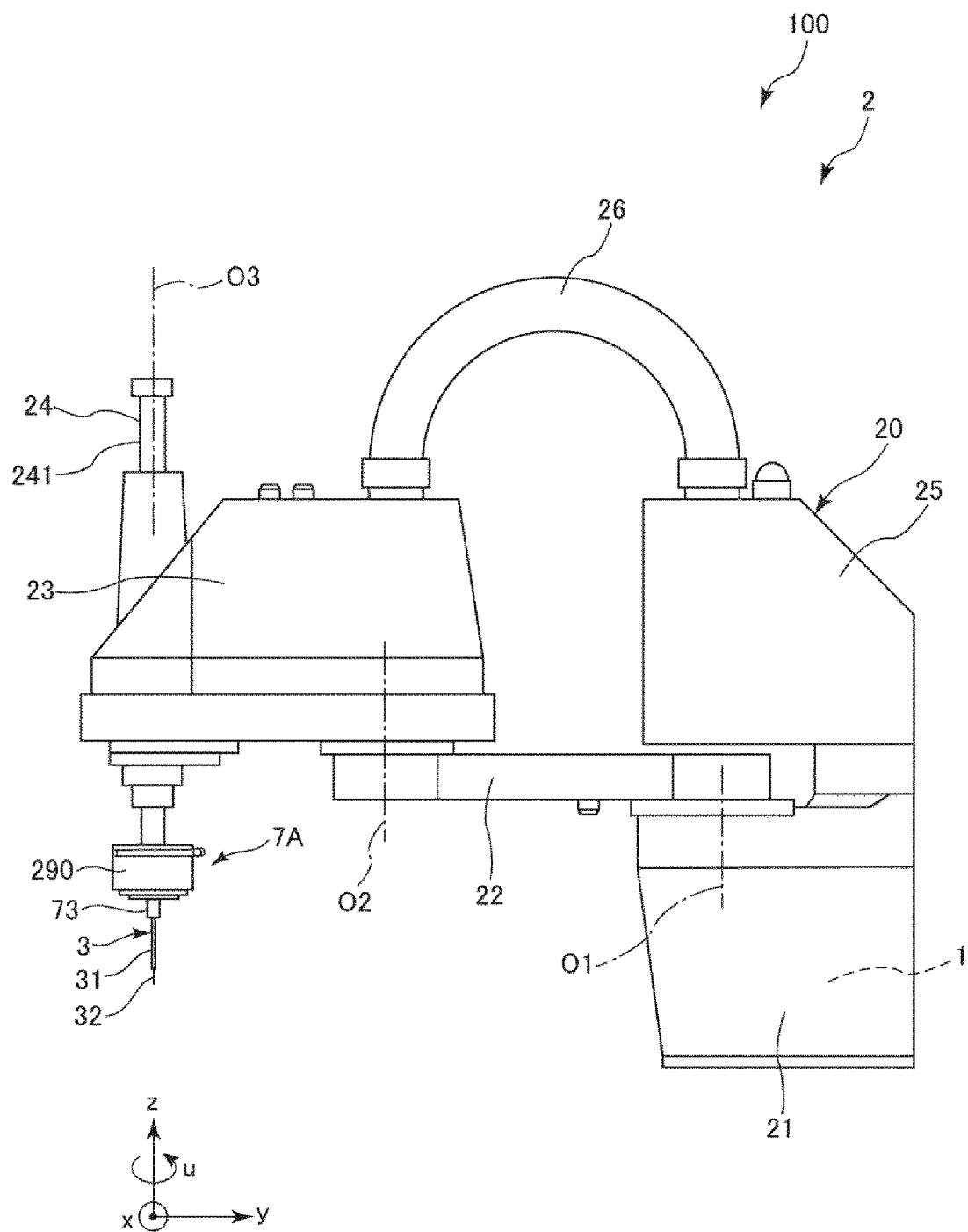
FIG. 13 is a side view showing a robot according to a second embodiment of the invention, and a robotic system equipped with the robot according to the second embodiment.

FIG. 13 is a side view showing a robot according to a second embodiment of the invention, and a robotic system equipped with the robot according to the second embodiment.

Figure 14:
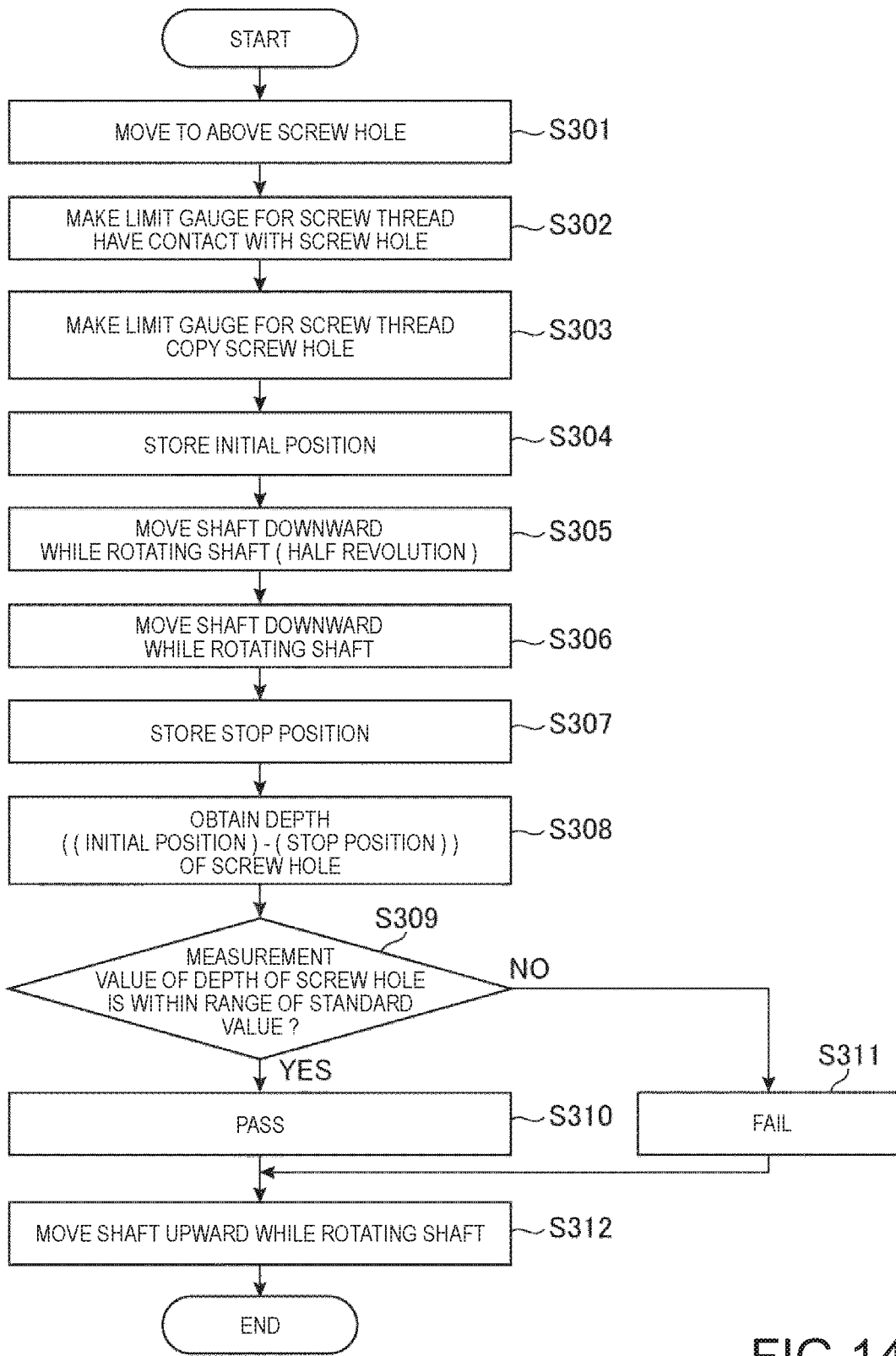
FIG. 14 is a flowchart showing a control operation in an inspection of the screw hole of the control device of the robotic system shown in FIG. 13.
Figure 15:
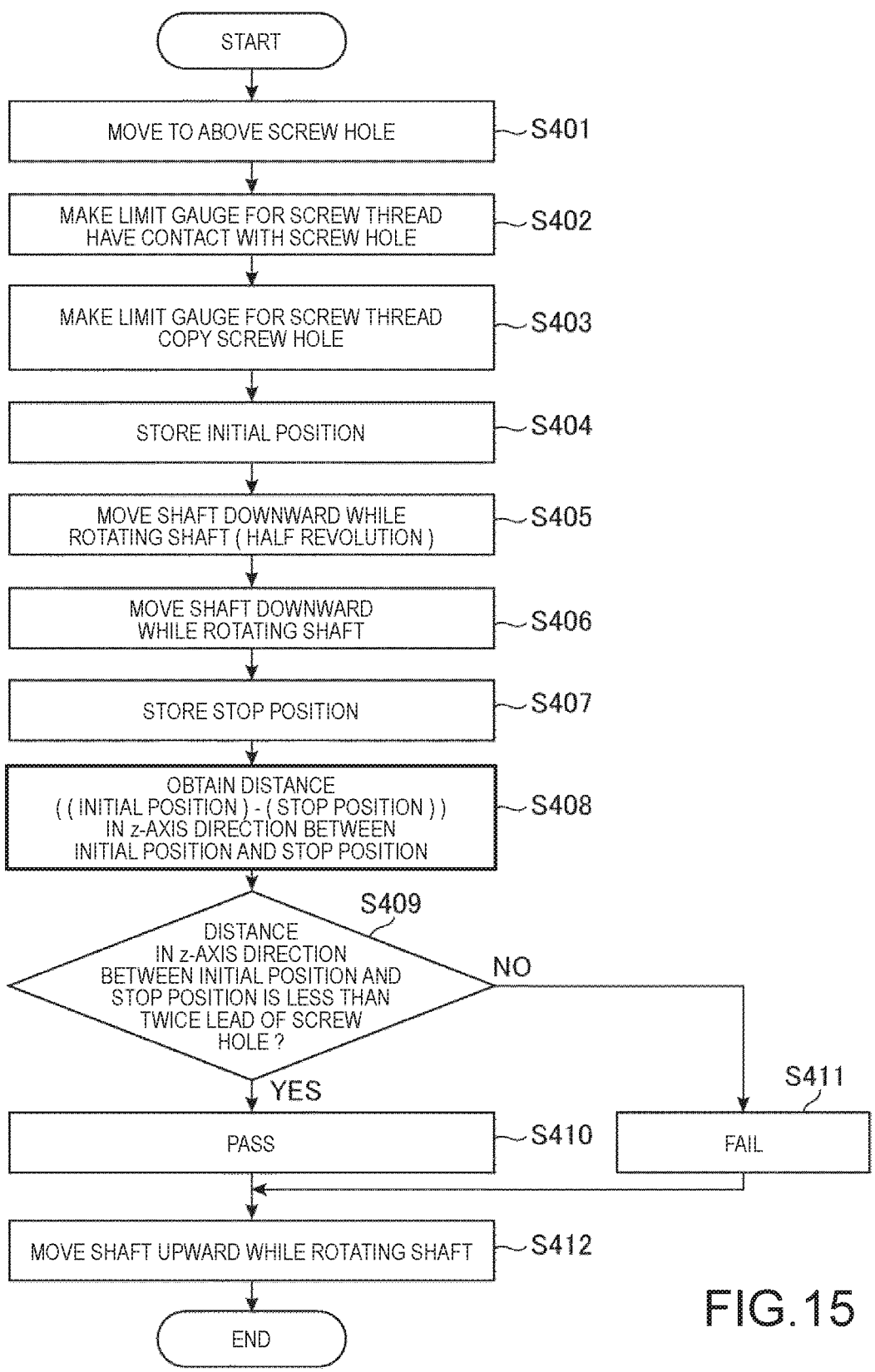
FIG. 15 is a flowchart showing a control operation in an inspection of the screw hole of the control device of the robotic system shown in FIG. 13.

FIG. 14 and FIG. 15 are each a flowchart showing a control operation in an inspection of the control device of the robotic system shown in FIG. 13.

The second embodiment will hereinafter be described focusing mainly on the differences from the embodiment described above, and the description of substantially the same matters will be omitted.

As shown in FIG. 13, in the second embodiment, an end effector 7A is detachably connected to the tip part of the shaft 241.

The end effector 7A has the force detection section 290, an attachment part 73 attached to the force detection section 290, and the limit gauge for screw thread 3 detachably attached to the attachment part 73. In other words, the end effector 7A does not have a motor. In the end effector 7A, the force detection section 290 is detachably attached to the tip part of the shaft 241 directly or via a coupling member not shown. Further, the central axis of the shaft 241, namely the third rotational axis O3, and the central axis of the limit gauge for screw thread 3 coincide with each other. In other words, the third rotational axis O3 and the limit gauge for screw thread 3 overlap each other viewed from the axial direction of the third rotational axis O3.

Then, the operation (the control operation of the control device 1) of the robotic system 100 in the inspection of the screw hole 82 provided to the work 81 will be described based on FIG. 7 through FIG. 10, FIG. 14, and FIG. 15.

Firstly, the screw hole 82 of the inspection object is a bottomed (non-penetrating) screw hole provided to the work 81.

Further, in the present embodiment, the limit gauge for screw thread 3 is rotated by the robot arm 20 in the inspection of the screw hole 82. Hereinafter, this method is referred to as a "robotic method."

Firstly, the operation of the robotic system 100 in the inspection of the GO aspect of the screw hole 82 will be described.

Firstly, the robot 2 is made to operate to move (step S301 shown in FIG. 14) the tip of the GO gauge 32 of the limit gauge for screw thread 3 to above the screw hole 82. In the step S301, the force control is not performed on the robot 2, but the position control is performed thereon. Further, in the step S302 described later and the steps following the step S302, the position control and the force control are performed on the robot 2.

Subsequently, as shown in FIG. 7, the robot 2 is made to operate, in other words, the shaft 241 is moved downward to make the tip of the GO gauge 32 have contact with the screw hole 82 (step S302) (the first process in the control method). In this operation of the robot 2, the force in the z-axis direction applied to the limit gauge for screw thread 3 is detected by the force detection section 290 to perform the force control (the impedance control) in the z-axis direction to operate the robot 2. Further, the target force in the z-axis direction of the force control is not particularly limited, but is arbitrarily set in accordance with a variety of conditions, and is, for example, 2 N citing an example. Thus, the tip of the GO gauge 32 has contact with the entrance of the screw hole 82.

It should be noted that it is also possible to move the limit gauge for screw thread 3 in the z-axis direction using the position control, for example, and then stop the limit gauge for screw thread 3 in the case in which predetermined force (e.g., 2 N) is detected in the z-axis direction by the force detection section 290, for example, instead of the force control.

Subsequently, as shown in FIG. 8, the robot 2 is made to operate to make the tip of the GO gauge 32 copy the entrance of the screw hole 82 (step S303) (the second process in the control method). In this operation of the robot 2, the force in the x-axis direction and the force in the y-axis direction applied to the limit gauge for screw thread 3 are detected by the force detection section 290, and then the limit gauge for screw thread 3 is moved so as to reduce the force in a direction perpendicular to the axial direction of the screw hole 82, namely the force in the x-axis direction and the force in the y-axis direction, based on the detection information of the force detection section 290.

Specifically, the force control (the impedance control) is performed with respect to each of the directions perpendicular to the axial direction of the screw hole 82, namely the x-axis direction and the y-axis direction, to operate the robot 2. Further, the target force in the x-axis direction and the target force in the y-axis direction of the force control are not particularly limited, but are arbitrarily set in accordance with a variety of conditions, and are each, for example, 0 N citing an example. Thus, the limit gauge for screw thread 3 moves in a direction in which the force in the x-axis direction and the force in the y-axis direction applied to the limit gauge for screw thread 3 decrease, and the center of the tip of the GO gauge 32 moves to the center of the entrance of the screw hole 82. Therefore, the GO gauge 32 is disposed inside the screw hole 82 viewed from the z-axis direction.

Subsequently, the current position in the z-axis direction of the tip of the GO gauge 32 is stored (step S304) in the storage section 14 as an initial position.

Then, the shaft 241 is moved downward (step S305) while rotated in a predetermined direction. The predetermined direction is a direction of tightening the GO gauge 32. Thus, the limit gauge for screw thread 3 rotates, and due to the rotation of the limit gauge for screw thread 3 and the downward motion of the shaft 241, the GO gauge 32 is screwed in the screw hole 82, and the tip of the GO gauge 32 moves toward (in the direction of tightening the GO gauge 32) the bottom of the screw hole 82. In this operation of the robot 2, the force in the x-axis direction, the force in the y-axis direction, and the force in the z-axis direction applied to the limit gauge for screw thread 3 are detected by the force detection section 290 to perform the force control (the impedance control) in each of the x-axis direction, the y-axis direction, and the z-axis direction, and further, the position control is performed in each of the z-axis direction and the u-axis direction (the direction around the z axis) to operate the robot 2. Further, the target force in the x-axis direction, the target force in the y-axis direction, and the target force in the z-axis direction of the force control are not particularly limited, but are arbitrarily set in accordance with a variety of conditions, and the target force in the x-axis direction, the target force in the y-axis direction, and the target force in the z-axis direction are each, for example, 0 N citing an example. Thus, it is possible to prevent the GO gauge 32 from damaging the screw hole 82, and further, it is possible to smoothly and accurately move the GO gauge 32 in the tightening direction. The step S305 is performed until the limit gauge for screw thread 3 rotates with a predetermined number of revolutions (e.g., a half revolution). It should be noted that it is also possible to omit the force control in the z-axis direction in the present zone.

Then, the shaft 241 is continuously moved downward (step S306) while rotated in the predetermined direction. In this operation of the robot 2, the force in the x-axis direction and the force in the y-axis direction applied to the limit gauge for screw thread 3 are detected by the force detection section 290 to perform the force control (the impedance control) in each of the x-axis direction and the y-axis direction, and further, the position control is performed in each of the z-axis direction and the u-axis direction (the direction around the z axis) to operate the robot 2. In this case, the force control is not performed in the z-axis direction in the present zone. Further, the target force in the x-axis direction and the target force in the y-axis direction of the force control are not particularly limited, but are arbitrarily set in accordance with a variety of conditions, and are each, for example, 0 N citing an example. Thus, it is possible to prevent the GO gauge 32 from damaging the screw hole 82, and further, it is possible to smoothly and accurately move the GO gauge 32 in the tightening direction. Further, the force in the z-axis direction is detected by the force detection section 290, and when predetermined force (e.g., 3 N) is detected in the z-axis direction, the shaft 241 is stopped. In such a manner as described above, the tip of the GO gauge 32 has contact with the bottom of the screw hole 82 as shown in FIG. 9. In other words, the GO gauge 32 is tightened into the screw hole 82. It should be noted that the tip of the GO gauge 32 does not reach the bottom of the screw hole 82 in some cases. Further, in the step S306, since the force control is not performed in the z-axis direction, the detection information of the force in the z-axis direction of the force detection section 290 can be used for other control. Specifically, detection of predetermined force in the z-axis direction is used as a stop condition for the shaft 241.

Subsequently, the current position in the z-axis direction of the tip of the GO gauge 32 is stored (step S307) in the storage section 14 as a stop position.

Then, the depth (length in the z-axis direction) of the screw hole 82 is obtained (step S308) based on the initial position and the stop position. The depth of the screw hole 82 is obtained by subtracting the stop position from the initial position, and is stored in the storage section 14 as a measurement value.

Subsequently, the decision to pass or fail is made for the GO aspect of the screw hole 82 based on the measurement value of the depth of the screw 82 and the upper limit value and the lower limit value of the standard value (a specified value) of the depth of the screw hole 82.

Specifically, whether or not the measurement value of the depth of the screw hole 82 is within a range of the standard value of the depth of the screw hole 82 is determined (step S309), and if it is within the range, "PASS" is determined (step S310), and if it is out of the range, "FAIL" is determined (step S311).

The inspection result in the GO aspect of the screw hole 82 is stored in the storage section 14, and is displayed by the display device 41 as needed.

Subsequently, the shaft 241 is moved upward while rotated in an opposite direction to that in the step S305 (step S312). Thus, the limit gauge for screw thread 3 rotates, and due to the rotation of the limit gauge for screw thread 3 and the upward motion of the shaft 241, the limit gauge for screw thread 3 moves in a direction in which the GO gauge 32 is disengaged from the screw hole 82 (the loosening direction). In the operation of the robot 2, the force in the x-axis direction, the force in the y-axis direction, and the force in the z-axis direction applied to the limit gauge for screw thread 3 are detected by the force detection section 290 to perform the force control (the impedance control) in each of the x-axis direction, the y-axis direction, and the z-axis direction, and further, the position control is performed in the z-axis direction and the u-axis direction (the direction around the z axis) to operate the robot 2. Further, the target force in the x-axis direction, the target force in the y-axis direction, and the target force in the z-axis direction of the force control are not particularly limited, but are arbitrarily set in accordance with a variety of conditions, and the target force in the x-axis direction, the target force in the y-axis direction, and the target force in the z-axis direction are each, for example, 0 N citing an example. Thus, it is possible to prevent the GO gauge 32 from damaging the screw hole 82, and further, it is possible to smoothly and accurately move the GO gauge 32 in the disengaging direction. In such a manner as described above, the limit gauge for screw thread 3 is moved until the tip of the GO gauge 32 reaches the position distant as much as a predetermined distance (e.g., 0.2 mm) toward the + side in the z-axis direction from the initial position, and then the shaft 241 is stopped as shown in FIG. 10. It should be noted that it is also possible to omit the force control in the z-axis direction in a part or the whole of the present zone. With the above, the program is terminated.

Then, the operation of the robotic system 100 in the inspection of the NO-GO aspect of the screw hole 82 will be described.

Firstly, the step S401 through the step S405 shown in FIG. 15 are the same as the step S301 through the step S305 except that the GO gauge 32 is replaced with the NO-GO gauge 33 in the step S301 through the step S305 described above, and the description thereof will be omitted.

Subsequently to the step S405, the shaft 241 is continuously moved downward (step S406) while rotated in the predetermined direction. In this operation of the robot 2, the force in the x-axis direction and the force in the y-axis direction applied to the limit gauge for screw thread 3 are detected by the force detection section 290 to perform the force control (the impedance control) in each of the x-axis direction and the y-axis direction, and further, the position control is performed in each of the z-axis direction and the u-axis direction (the direction around the z axis) to operate the robot 2. Further, the target force in the x-axis direction and the target force in the y-axis direction of the force control are not particularly limited, but are arbitrarily set in accordance with a variety of conditions, and are each, for example, 0 N citing an example. Thus, it is possible to prevent the NO-GO gauge from damaging the screw hole 82, and further, it is possible to smoothly and accurately move the NO-GO gauge 33 in the tightening direction. Further, the force in the z-axis direction is detected by the force detection section 290, and when predetermined force (e.g., 3 N) is detected in the z-axis direction, the shaft 241 is stopped. In such a manner as described above, the limit gauge for screw thread 3 stops before the tip of the NO-GO gauge 33 reaches the bottom of the screw hole 82, or stops when the tip of the NO-GO gauge 33 reaches the bottom of the screw hole 82. Further, in the step S406, since the force control is not performed in the z-axis direction, the detection information of the force in the z-axis direction of the force detection section 290 can be used for other control. Specifically, detection of predetermined force in the z-axis direction is used as a stop condition for the shaft 241.

Subsequently, the current position in the z-axis direction of the tip of the NO-GO gauge 33 is stored (step S407) in the storage section 14 as a stop position.

Then, the distance in the z-axis direction between the initial position and the stop position is obtained (step S408). In the step S408, the stop position is subtracted from the initial position, and then, the subtraction result is stored in the storage section 14.

Then, the decision to pass or fail is made for the NO-GO aspect of the screw hole 82 based on the distance in the z-axis direction between the initial position and the stop position.

Specifically, whether or not the distance in the z-axis direction between the initial position and the stop position is less than twice the lead of the screw hole 82 is determined (step S409), and if it is less than twice the lead of the screw hole 82, "PASS" is determined (step S410), and if it is equal to or more than twice the lead of the screw hole 82, "FAIL" is determined (step S411). It should be noted that "twice" as the threshold value to pass or fail is illustrative only, and the threshold value can also be set to a different value.

The inspection result in the NO-GO aspect of the screw hole 82 is stored in the storage section 14, and is displayed by the display device 41 as needed.

It should be noted that in the present embodiment, the decision to pass or fail is made based on the distance in the z-axis direction between the initial position and the stop position with respect to the NO-GO aspect of the screw hole 82, but this is not a limitation, and it is possible to make the decision to pass or fail based on, for example, the number of revolutions (an amount of the rotation) of the limit gauge for screw thread 3 (the NO-GO gauge 33). Specifically, the number of revolutions (an amount of rotation) which the limit gauge for screw thread 3 makes until the tip of the NO-GO gauge 33 moves from the initial position to the stop position is obtained to determine whether or not the number of the revolutions which the limit gauge for screw thread 3 makes is less than two revolutions, and if it is less than two revolutions, "PASS" is determined, and if it is equal to or more than two revolutions, "FAIL" is determined. It should be noted that "two revolutions" as the threshold value to pass or fail is illustrative only, and the threshold value can also be set to a different value.

Further, the step S412 is the same as the step S312 except that the GO gauge 32 is replaced with the NO-GO gauge 33 in the step S312 described above, and the description thereof will be omitted. With the above, the program is terminated.

According also to such a second embodiment as described hereinabove, substantially the same advantages as in the embodiment described above can be exerted.

As described hereinabove, in the case in which the robot control section 11 (the control section) rotates the limit gauge for screw thread 3 (the screw gauge) around the axis of the screw hole 82, the robot control section 11 (the control section) rotates the limit gauge for screw thread 3 (the screw gauge) using the robot arm 20.

Thus, it is possible to rotate the limit gauge for screw thread 3 without separately attaching a device for rotating the limit gauge for screw thread 3 to the robot arm 20, and thus, it is possible to achieve reduction in size of the robot 2.

Further, the robot arm 20 has the first arm 22, the second arm 23, and the working head 24 provided with the shaft 241 (the plurality of arms). The robot control section 11 (the control section) rotates the limit gauge for screw thread 3 (the screw gauge) attached to the force detection section 290 provided to the shaft 241 as an example of the tip most arm of the robot arm 20.

Thus, it is possible to easily and accurately perform the control of rotating the limit gauge for screw thread 3.

Third Embodiment

Figure 16:
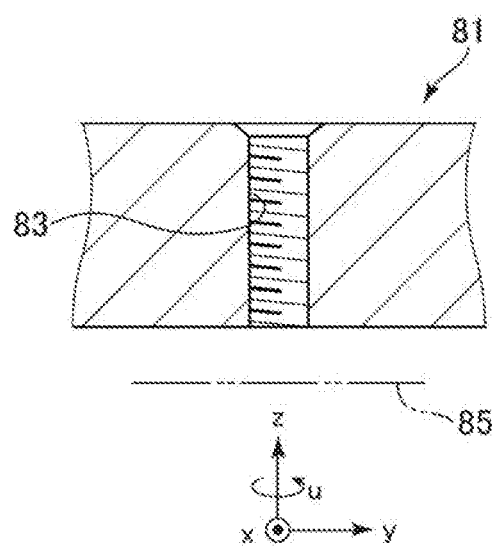
FIG. 16 is a diagram for explaining the inspection of the screw hole in a third embodiment of the invention.

FIG. 16 is a diagram for explaining the inspection of the screw hole in a third embodiment of the invention.

Figure 17:
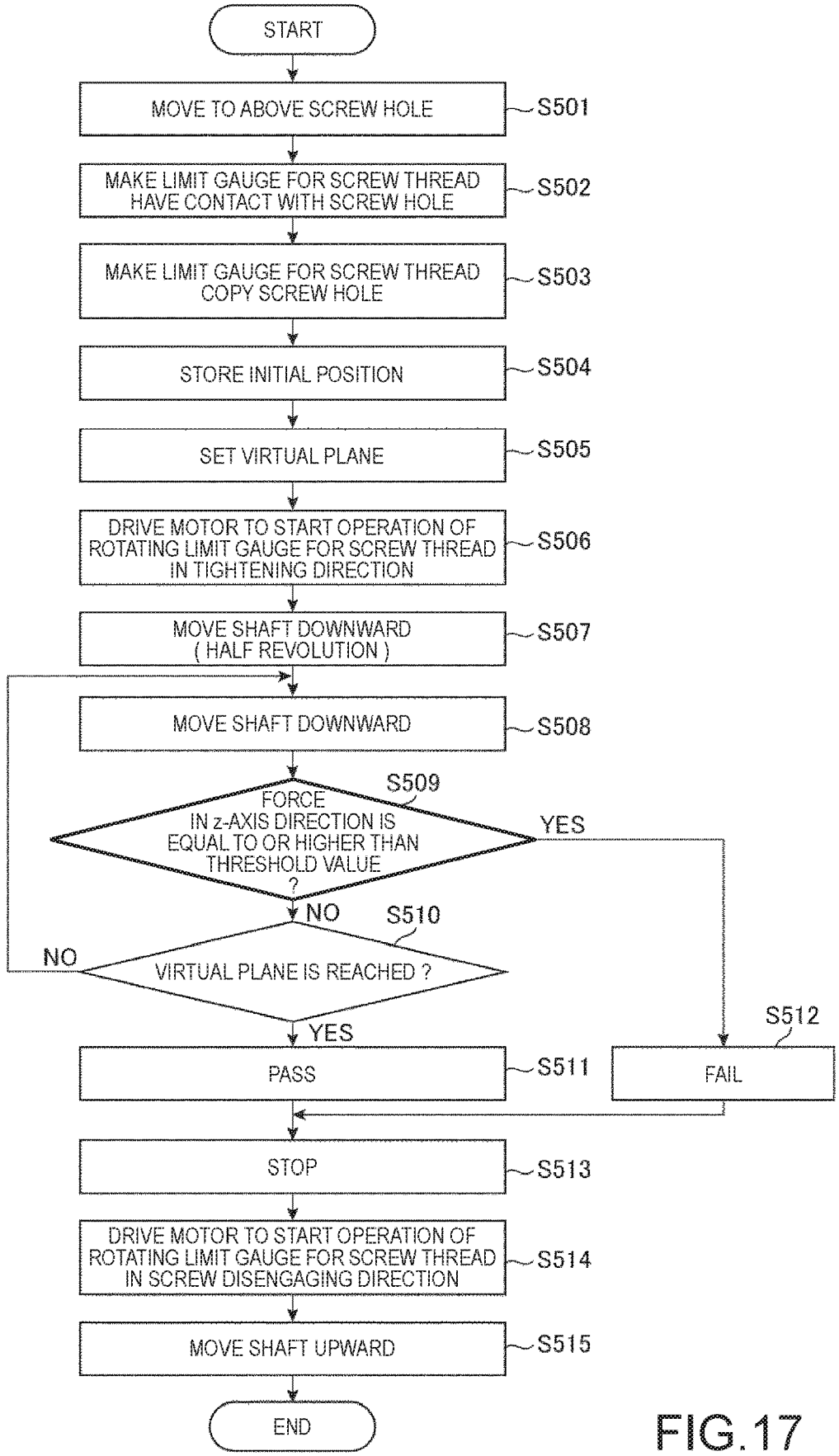
FIG. 17 is a flowchart showing a control operation of a control device in an inspection of the screw hole in the third embodiment.
Figure 18:
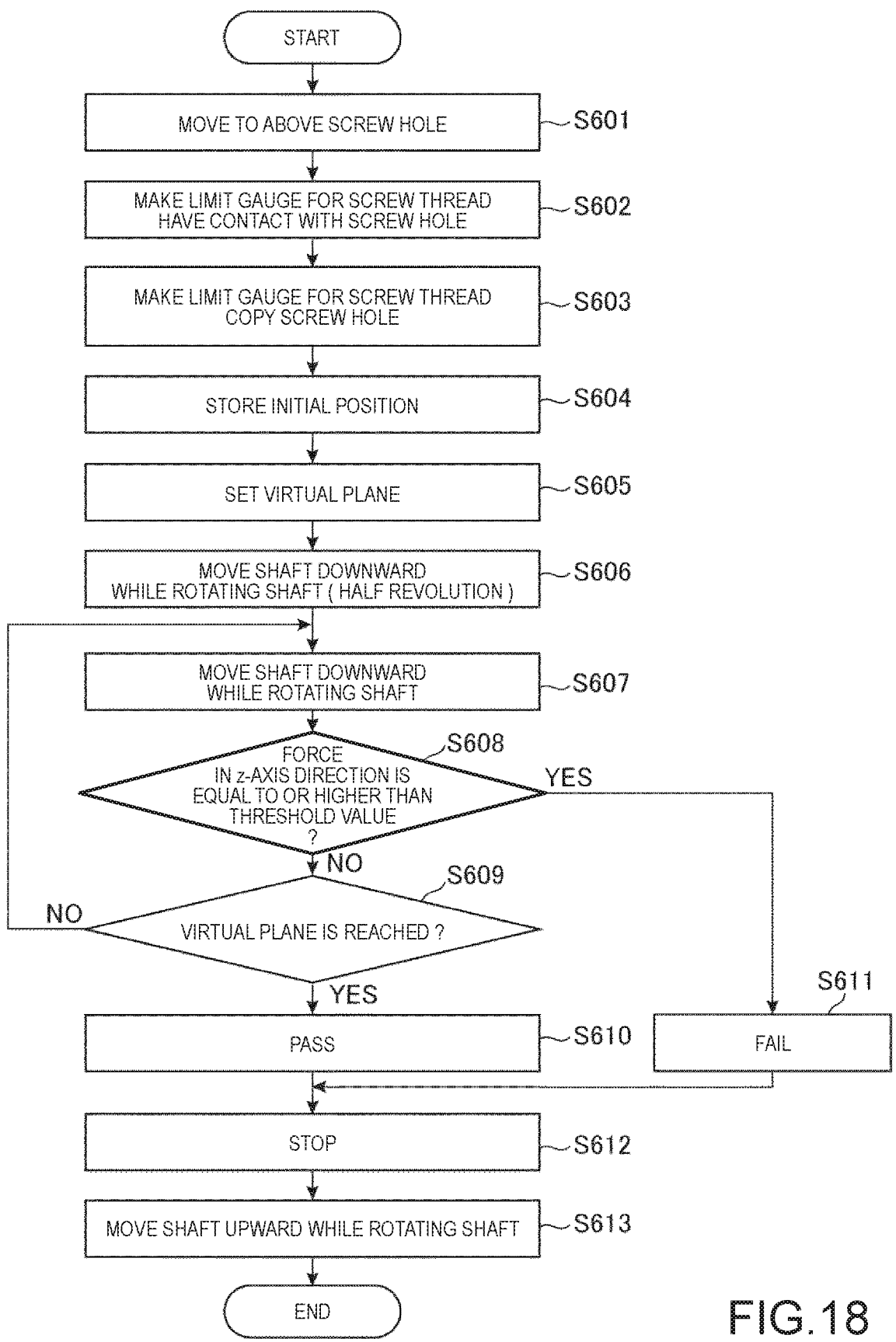
FIG. 18 is a flowchart showing a control operation of a control device in an inspection of the screw hole in the third embodiment.

FIG. 17 and FIG. 18 are each a flowchart showing a control operation of a control device in an inspection of the screw hole in the third embodiment.

The third embodiment will hereinafter be described focusing mainly on the differences from the embodiments described above, and the description of substantially the same matters will be omitted.

As shown in FIG. 16, in the third embodiment, the screw hole 83 (the internal thread) as the inspection object is a screw hole (a through hole) provided to the work 81 and penetrating the work 81. The inspection of the penetrating screw hole 83 is different in the method (how to make the decision to pass or fail) of the inspection of the GO aspect from the inspection of the bottomed screw hole 82 described above.

Then, the operation (a control operation of the control device 1) of the robotic system 100 in the inspection of the screw hole 83 (the through hole) provided to the work 81 will be described based on FIG. 17 and FIG. 18.

It should be noted that since the operation of the robotic system 100 in the inspection of the NO-GO aspect of the screw hole 83 is substantially the same as in the case of the inspection of the bottomed screw hole 82 described above, the description thereof will be omitted, and the operation of the robotic system 100 in the inspection of the GO aspect of the screw hole 83 will hereinafter be described.

Firstly, the case of using the robotic system 100 according to the first embodiment, namely the case of the motor method, will be described based on FIG. 17.

Firstly, the step S501 through the step S504, the step S506 and the step S507 shown in FIG. 17 are substantially the same as the step S101 through the step S106 described above, and the description thereof will be omitted.

After the step S504, a virtual plane 85 having the z axis as the normal line is set (step S505).

The virtual plane 85 is set at a position distant as much as a predetermined distance from the initial position on the − side (downward) in the z-axis direction. The predetermined distance is set to a value longer than the depth of the screw hole 83 as much as a predetermine length (e.g., 1 mm). In other words, the virtual plane 85 is set so that the position in the z-axis direction of the virtual plane 85 is set to a predetermined position on the − side in the z-axis direction from the exit (an opening in the −z-axis direction) of the screw hole 83. It should be noted that the predetermined distance can also be the same as the depth of the screw hole 83. In other words, the virtual plane 85 can be set so that the position in the z-axis direction of the virtual plane 85 becomes the same position as the exit of the screw hole 83.

Then, the step S506 and the step S507 are executed to continuously move the shaft 241 downward (step S508). In the operation of the robot 2, the force in the x-axis direction and the force in the y-axis direction applied to the limit gauge for screw thread 3 are detected by the force detection section 290 to perform the force control (the impedance control) in each of the x-axis direction and the y-axis direction, and further, the position control is performed in the z-axis direction to operate the robot 2. Further, the target force in the x-axis direction and the target force in the y-axis direction of the force control are not particularly limited, but are arbitrarily set in accordance with a variety of conditions, and are each, for example, 0 N citing an example. Thus, it is possible to prevent the GO gauge 32 from damaging the screw hole 83, and further, it is possible to smoothly and accurately move the GO gauge 32 in the tightening direction.

Subsequently, the force in the z-axis direction is detected by the force detection section 290 to determine (step S509) whether or not the force in the z-axis direction thus detected is equal to or higher than a predetermined threshold value (e.g., 3 N).

In the case in which it has been determined in the step S509 that the force in the z-axis direction detected by the force detection section 290 is not equal to nor higher than the threshold value (is lower than the threshold value), whether or not the tip of the GO gauge 32 has moved to the virtual plane 85 is determined (step S510).

In the case in which it has been determined that the tip of the GO gauge 32 has not moved to the virtual plane 85 in the step S510, the process returns to the step S508, and then the step S508 and the following steps are executed once again.

Further, in the case in which it has been determined that the tip of the GO gauge 32 has moved to the virtual plane 85 in the step S510, "PASS" is determined (step S511) with respect to the GO aspect of the screw hole 83. It should be noted that the case in which "YES" is determined in the step S510 is the case in which the tip of the GO gauge 32 has moved to the virtual plane 85 while the force in the z-axis direction detected by the force detection section 290 is kept lower than the threshold value.

Further, in the case in which it has been determined in the step S509 that the force in the z-axis direction detected by the force detection section 290 is equal to or higher than the threshold value, "FAIL" is determined (step S512) with respect to the GO aspect of the screw hole 83. It should be noted that the case in which "YES" is determined in the step S509 is the case in which the force in the z-axis direction detected by the force detection section 290 becomes equal to or higher than the threshold value before the tip of the GO gauge 32 moves to the virtual plane 85.

The inspection result in the GO aspect of the screw hole 83 is stored in the storage section 14, and is displayed by the display device 41 as needed.

Then, the shaft 241 and the motor 72 are stopped (step S513). As described above, since the force control is not performed in the z-axis direction from the step S508 until the shaft 241 is stopped, the detection information of the force in the z-axis direction of the force detection section 290 can be used in other control, specifically in the step S509.

Further, the step S514 and the step S515 are substantially the same as the step S113 and the step S114 described above, and the description thereof will be omitted. With the above, the program is terminated.

Then, the case of using the robotic system 100 according to the second embodiment, namely the case of the robotic method, will be described based on FIG. 18.

Firstly, the step S601 through the step S604, and the step S606 are substantially the same as the step S301 through the step S305 described above, and the description thereof will be omitted.

After the step S604, the virtual plane 85 having the z axis as the normal line is set (step S605). The setting of the virtual plane 85 is substantially the same as the step S505 described above, and the description thereof will be omitted.

Subsequently, the step S606 is executed, and then the shaft 241 is continuously moved downward (step S607) while rotated in the predetermined direction. In this operation of the robot 2, the force in the x-axis direction and the force in the y-axis direction applied to the limit gauge for screw thread 3 are detected by the force detection section 290 to perform the force control (the impedance control) in each of the x-axis direction and the y-axis direction, and further, the position control is performed in each of the z-axis direction and the u-axis direction (the direction around the z axis) to operate the robot 2. Further, the target force in the x-axis direction and the target force in the y-axis direction of the force control are not particularly limited, but are arbitrarily set in accordance with a variety of conditions, and are each, for example, 0 N citing an example. Thus, it is possible to prevent the GO gauge 32 from damaging the screw hole 83, and further, it is possible to smoothly and accurately move the GO gauge 32 in the tightening direction.

Subsequently, the force in the z-axis direction is detected by the force detection section 290 to determine (step S608) whether or not the force in the z-axis direction thus detected is equal to or higher than a predetermined threshold value (e.g., 3 N).

In the case in which it has been determined in the step S608 that the force in the z-axis direction detected by the force detection section 290 is not equal to nor higher than the threshold value (is lower than the threshold value), whether or not the tip of the GO gauge 32 has moved to the virtual plane 85 is determined (step S609).

In the case in which it has been determined in the step S609 that the tip of the GO gauge 32 has not moved to the virtual plane 85, the process returns to the step S607, and then the step S607 and the following steps are executed once again.

Further, in the case in which it has been determined in the step S609 that the tip of the GO gauge 32 has moved to the virtual plane 85, "PASS" is determined (step S610) with respect to the GO aspect of the screw hole 83. It should be noted that the case in which "YES" is determined in the step S609 is the case in which the tip of the GO gauge 32 has moved to the virtual plane 85 while the force in the z-axis direction detected by the force detection section 290 is kept lower than the threshold value.

Further, in the case in which it has been determined in the step S608 that the force in the z-axis direction detected by the force detection section 290 is equal to or higher than the threshold value, "FAIL" is determined (step S611) with respect to the GO aspect of the screw hole 83. It should be noted that the case in which "YES" is determined in the step S608 is the case in which the force in the z-axis direction detected by the force detection section 290 becomes equal to or higher than the threshold value before the tip of the GO gauge 32 moves to the virtual plane 85.

The inspection result in the GO aspect of the screw hole 83 is stored in the storage section 14, and is displayed by the display device 41 as needed.

Then, the shaft 241 is stopped (step S612). As described above, since the force control is not performed in the z-axis direction from the step S607 until the shaft 241 is stopped, the detection information of the force in the z-axis direction of the force detection section 290 can be used in other control, specifically in the step S608.

Further, the step S613 is substantially the same as the step S312 described above, and the description thereof will be omitted. With the above, the program is terminated.

According also to such a third embodiment as described hereinabove, substantially the same advantages as in the embodiments described above can be exerted.

As described hereinabove, in the control device 1, in the inspection of the GO aspect of the screw hole, the way of making the decision to pass or fail of the screw hole is different between the case in which the screw hole is the penetrating screw hole 83 and the case in which the screw hole is the non-penetrating screw hole 82.

Thus, it is possible to accurately perform the inspection in each of the penetrating screw hole 83 and the non-penetrating screw hole 82.

Fourth Embodiment

FIG. 19 is a perspective view of an end effector in a fourth embodiment of the invention. FIG. 20 is a front view of the end effector in the fourth embodiment.

The fourth embodiment will hereinafter be described focusing mainly on the differences from the embodiments described above, and the description of substantially the same matters will be omitted.

As shown in FIG. 19 and FIG. 20, in the fourth embodiment, the end effector 7B is detachably connected to the tip part of the shaft 241.

As shown in FIG. 19 and FIG. 20, the end effector 7B includes the force detection section 290, an attachment section 74 (a frame) attached to the force detection section 290, the motor 72 provided to the attachment section 74, a support section 77 rotatably provided to the attachment section 74, and the limit gauge for screw thread 3 detachably attached to the support section 77. The motor is disposed with an offset with respect to the force detection section 290 viewed from the z-axis direction. In other words, the motor 72 is disposed at a position separate from the force detection section 290 viewed from the z-axis direction so as to overlap the force detection section 290 viewed from the y-axis direction (a horizontal direction). Thus, it is possible to shorten the length from the tip of the shaft 241 to the tip of the limit gauge for screw thread 3 to achieve reduction in size of the robot 2 compared to the case in which the motor 72 is disposed without the offset with respect to the force detection section 290.

Further, the end effector 7B has a pulley (not shown) connected to the rotary shaft of the motor 72, a pulley 76 connected to the support section 77, and a timing belt 75 stretched between the pulley and the pulley 76. The pulley connected to the rotary shaft of the motor 72, the pulley 76, and the timing belt 75 constitute a power transmission mechanism for transmitting the drive power of the motor 72 to the limit gauge for screw thread 3. It should be noted that the power transmission mechanism is not limited to one with such a configuration, but can also be formed of, for example, a plurality of gear wheels meshing with each other.

Further, the end effector 7B has a position sensor (an angular sensor) not shown for detecting the rotational angle of the rotary shaft of the motor 72, and is arranged to be able to detect the rotational angle of the rotary shaft of the motor 72B using the position sensor.

In this end effector 7B, the central axis of the shaft 241 (see FIG. 1), namely the third rotational axis O3 (see FIG. 1), and the central axis of the limit gauge for screw thread 3 coincide with each other. In other words, the third rotational axis O3 and the limit gauge for screw thread 3 overlap each other viewed from the axial direction of the third rotational axis O3.

According also to such a fourth embodiment as described hereinabove, substantially the same advantages as in the embodiments described above can be exerted.

As described hereinabove, the robot arm 20 has the first arm 22, the second arm 23, and the working head 24 provided with the shaft 241 (the plurality of arms). The robot control section 11 (the control section) rotates the limit gauge for screw thread 3 (the screw gauge) using the motor 72 disposed with the offset with respect to the force detection section 290 provided to the shaft 241 as an example of the tip most arm of the robot arm 20.

Thus, it is possible to shorten the length from the tip of the robot arm 20 to the tip of the limit gauge for screw thread 3 to achieve reduction in size of the robot 2 compared to the case in which the motor 72 is disposed without the offset with respect to the force detection section 290.

Although the control device, the robot, and the control method according to the invention are described hereinabove based on the embodiments shown in the accompanying drawings, the invention is not limited to these embodiments, but the configuration of each of the constituents can be replaced with one having an identical function and an arbitrary configuration. Further, it is possible to add any other constituents. Further, it is also possible to add any other processes to the control method.

Further, the invention can be a combination of any two or more configurations (features) of the embodiments described above.

Further, although in the embodiment described above, the number of the rotational axes of the robot arm is three, the invention is not limited thereto, and the number of the rotational axes of the robot arm can be, for example, two or more than three. In other words, although in the embodiments described above, the number of the arms (links) is three, the invention is not limited thereto, and the number of the arms can be, for example, two or more than three.

Further, although in the embodiments described above, the number of the robot arms is one, the invention is not limited thereto, and the number of the robot arms can be, for example, two or more. In other words, the robot can also be a multi-arm robot such as a dual-arm robot.

Further, in the invention, the robot (a robot main body) can also be a robot different in type. As specific examples, there can be cited, for example, a vertical articulated robot, and a legged walking (locomotion) robot having legs. The "vertical articulated robot" denotes a robot having three or more axes (arms), two axes out of the three axes crossing (being perpendicular to) each other.

In the case of using the vertical articulated robot as the robot, it is possible to easily and promptly perform the inspection of screw holes provided to a plurality of surfaces (multiple surfaces) nonparallel to each other, namely a plurality of screw holes different in axial direction of the screw hole from each other.

Further, in the case of using the vertical articulated robot, it is also possible to move the limit gauge for screw thread 3 in a direction (tilted direction) tilted with respect to the z axis to make the tip of the GO gauge 32 have contact with the screw hole 82 in the step S102 described above, for example.

Further, in the case of using the vertical articulated robot having two robot arms as the robot, it is possible to attach the end effector having the limit gauge for screw thread to one of the robot arms, attach a hand (end effector) to the other of the robot arms, and grip (hold) the work provided with the screw hole with the hand to perform the inspection of the screw hole.

The entire disclosure of Japanese Patent Application No. 2017-108500, filed May 31, 2017, and No. 2018-009816, filed Jan. 24, 2018 are expressly incorporated by reference herein.

What is claimed is:

1. A control device adapted to control a robot including a robot arm provided with a force detector, the control device comprising:
   a processor that is configured to execute computer-executable instructions so as to control the robot,
   wherein the processor is configured to:
      operate the robot arm to move a screw gauge which is disposed on a tip side of the force detector of the robot arm, used for an inspection of a screw hole in a workpiece, and provided with an external thread, to make the external thread have contact with the screw hole;
      detect force applied to the screw gauge in an x-axis direction and a y-axis direction using the force detector to perform force control in a direction perpendicular to a direction of an axis of the screw hole based on detection information of the force detector;
      operate the robot arm to move the screw gauge in a direction so as to reduce the detected forces in the x-axis direction and the y-axis direction based on the force control to align the screw gauge with the screw hole;
      when the screw gauge is aligned with the screw hole, store a z-axis position of a distal end of the screw gauge as an initial position, the initial position being at an entrance to the screw hole and aligned with a plan on a surface of the workpiece;
      rotate the screw gauge and move the screw gauge from the initial position in a z-axis direction into the screw hole;
   stop rotation of the screw gauge based on detection of a force in the z-axis direction by the force detector;
   store the z-axis position of the distal end of the screw gauge as a stop position; and
   determine a depth of the screw hole based on a difference between the initial position and the stop position.

2. The control device according to claim 1, wherein
   the processor is configured not to perform the force control in the direction perpendicular to the direction of the axis of the screw hole in at least a part of a zone when inserting the external thread into the screw hole after making the external thread have contact with the screw hole.

3. The control device according to claim 1, wherein
the processor is configured to perform the force control in the direction perpendicular to the direction of the axis of the screw hole in at least a part of a zone when moving the external thread having been inserted into the screw hole toward an opposite direction to an insertion direction into the screw hole.

4. The control device according to claim 1, wherein
the processor is configured to make a decision to pass or fail of the screw hole based on at least one of depth information of the screw hole, rotation information of the screw gauge, and detection information of the force detector.

5. The control device according to claim 4, wherein
in the inspection of a GO aspect of the screw hole, a way of making the decision to pass or fail of the screw hole is different between a case in which the screw hole is a penetrating screw hole and a case in which the screw hole is a non-penetrating screw hole.

6. A robot comprising:
a robot arm provided with a force detector; and
a processor that is configured to execute computer-executable instructions so as to control the robot,
wherein the processor is configured to:
operate the robot arm to move a screw gauge which is disposed on a tip side of the force detector of the robot arm, used for an inspection of a screw hole in a workpiece, and provided with an external thread to make the external thread have contact with the screw hole;
detect force applied to the screw gauge in an x-axis direction and a y-axis direction using the force detector to perform force control in a direction perpendicular to a direction of an axis of the screw hole based on detection information of the force detector;
operate the robot arm to move the screw gauge in a direction so as to reduce the detected forces in the x-axis direction and the y-axis direction based on the force control to align the screw gauge with the screw hole;
when the screw gauge is aligned with the screw hole, store a z-axis position of a distal end of the screw gauge as an initial position, the initial position being at an entrance to the screw hole and aligned with a plane on a surface of the workpiece;
rotate the screw gauge and move the screw gauge from the initial position in a z-axis direction into the screw hole;
stop rotation of the screw gauge based on detection of a force in the z-axis direction by the force detector;
store the z-axis position of the distal end of the screw gauge as a stop position; and
determine a depth of the screw hole based on a difference between the initial position and the stop position.

7. The robot according to claim 6, wherein
the processor is configured not to perform the force control in the direction perpendicular to the direction of the axis of the screw hole in at least a part of a zone when inserting the external thread into the screw hole after making the external thread have contact with the screw hole.

8. The robot according to claim 6, wherein
the processor is configured to perform the force control in the direction perpendicular to the direction of the axis of the screw hole in at least a part of a zone when moving the external thread having been inserted into the screw hole toward an opposite direction to an insertion direction into the screw hole.

9. The robot according to claim 6, wherein
the processor is configured to make a decision to pass or fail of the screw hole based on at least one of depth information of the screw hole, rotation information of the screw gauge, and detection information of the force detector.

10. The robot according to claim 9, wherein
in the inspection of a GO aspect of the screw hole, a way of making the decision to pass or fail of the screw hole is different between a case in which the screw hole is a penetrating screw hole and a case in which the screw hole is a non-penetrating screw hole.

11. The robot according to claim 6, wherein
the processor is configured to make the robot arm rotate the screw gauge in a case of rotating the screw gauge around the axis.

12. The robot according to claim 11, wherein
the robot arm has a plurality of arms, and
the processor is configured to rotate the screw gauge attached to the force detector, the force detector being provided on a distal end of the plurality of arms of the robot arm.

13. The robot according to claim 12, wherein
the screw gauge is overlapped with a rotational axis of the distal end of the plurality of arms of the robot arm when viewed from an axial direction of the rotational axis.

14. The robot according to claim 6, wherein
the processor is configured to make a motor provided to the robot arm rotate the screw gauge in a case of rotating the screw gauge around the axis.

15. The robot according to claim 14, wherein
the robot arm has a plurality of arms, and
the motor is disposed with an offset with respect to the force detector, the force detector being provided on a distal end of the plurality of arms of the robot arm.

16. A method of controlling a robot including a robot arm provided with a force detector, the method comprising:
operating the robot arm to move a screw gauge which is disposed on a tip side of the force detector of the robot arm, used for an inspection of a screw hole in a workpiece, and has an external thread, to make the external thread have contact with the screw hole;
detecting force applied to the screw gauge in an x-axis direction and a y-axis direction using the force detector to perform force control in a direction perpendicular to a direction of an axis of the screw hole based on detection information of the force detector, and operating the robot arm to move the screw gauge in a direction so as to reduce the detected forces in the x-axis direction and the y-axis direction based on the force control to align the screw gauge with the screw hole;
when the screw gauge is aligned with the screw hole, storing a z-axis position of a distal end of the screw gauge as an initial position, the initial position being at an entrance to the screw hole and aligned with a plane on a surface of the workpiece;
rotating the screw gauge and move the screw gauge from the initial position in a z-axis direction into the screw hole;
stopping rotation of the screw gauge based on detection of a force in the z-axis direction by the force detector;
storing the z-axis position of the distal end of the screw gauge as a stop position; and determining a depth of the screw hole based on a difference between the initial position and the stop position.

17. A method of controlling a robot according claim 16, comprising:
not performing the force control in the direction perpendicular to the direction of the axis of the screw hole in at least a part of a zone when inserting the external thread into the screw hole after making the external thread have contact with the screw hole.

18. The method of controlling a robot according claim 16, comprising:
performing the force control in the direction perpendicular to the direction of the axis of the screw hole in at least a part of a zone when moving the external thread having been inserted into the screw hole toward an opposite direction to an insertion direction into the screw hole.

19. The method of controlling a robot according claim 16, comprising:
making a decision to pass or fail of the screw hole based on at least one of depth information of the screw hole, rotation information of the screw gauge, and detection information of the force detector.

20. The method of controlling a robot according claim 19, wherein
in the inspection of a GO aspect of the screw hole, a way of making the decision to pass or fail of the screw hole is different between a case in which the screw hole is a penetrating screw hole and a case in which the screw hole is a non-penetrating screw hole.

* * * * *